US008856956B2

(12) United States Patent
Stibel et al.

(10) Patent No.: US 8,856,956 B2
(45) Date of Patent: Oct. 7, 2014

(54) AUTOMATED ENTITY VERIFICATION

(75) Inventors: Jeffrey M. Stibel, Malibu, CA (US);
Aaron B. Stibel, Malibu, CA (US);
Peter Delgrosso, Malibu, CA (US);
Shailen Mistry, Malibu, CA (US);
Bryan Mierke, Los Angeles, CA (US);
Paul Servino, Los Angeles, CA (US);
Charles Chi Thoi Le, Santa Ana, CA
(US); David Lo, Culver City, CA (US);
David Allen Lyon, Hawthorne, CA (US)

(73) Assignee: Credibility Corp., Malibu, CA (US)

( * ) Notice: Subject to any disclaimer, the term of this patent is extended or adjusted under 35 U.S.C. 154(b) by 657 days.

(21) Appl. No.: 13/290,746

(22) Filed: Nov. 7, 2011

(65) Prior Publication Data

US 2013/0013553 A1   Jan. 10, 2013

Related U.S. Application Data

(60) Provisional application No. 61/505,738, filed on Jul. 8, 2011.

(51) Int. Cl.
| | |
|---|---|
| *G06F 21/10* | (2013.01) |
| *G06Q 50/00* | (2012.01) |
| *G06Q 10/10* | (2012.01) |
| *H04L 29/06* | (2006.01) |
| *H04L 9/32* | (2006.01) |
| *G06F 21/31* | (2013.01) |

(52) U.S. Cl.
CPC ............ *H04L 9/3215* (2013.01); *H04L 9/3228* (2013.01); *G06Q 50/01* (2013.01); *G06Q 10/107* (2013.01); *H04L 2463/082* (2013.01); *H04L 63/08* (2013.01); *G06F 21/31* (2013.01)
USPC .......................................................... 726/28

(58) Field of Classification Search
CPC ............ H04L 9/3215; H04L 2463/082; H04L 9/3228
USPC .......................................................... 726/28
See application file for complete search history.

(56) References Cited

U.S. PATENT DOCUMENTS

| | | |
|---|---|---|
| 5,872,917 A | 2/1999 | Hellman |
| 6,766,454 B1 | 7/2004 | Riggins |

(Continued)

OTHER PUBLICATIONS eBay's ID Verify, The Advantages of eBay's ID Verify, May 2004, Retrieved from the Internet <URL: auctionbytes.com/cab/abu/y204/m05/abu0119/s03>, pp. 1-2 as printed.*

(Continued)

*Primary Examiner* — Michael Chao
(74) *Attorney, Agent, or Firm* — Los Angeles Patent Group; Arman Katiraei

(57) ABSTRACT

Some embodiments provide a verification system for automated verification of entities. The verification system automatedly verifies entities using a two part verification campaign. One part verifies that the entity is the true owner of the entity account to be verified. This verification step involves (1) the entity receiving a verification code at the entity account and returning the verification code to the verification system, (2) the entity associating an account that it has registered at a service provider to an account that the verification system has registered at the service provider, (3) both. Another part verifies the entity can respond to communications that are sent to methods of contact that have been previously verified as belonging to the entity. The verification system submits a first communication with a code using a verified method of contact. The verification system then monitors for a second communication to be returned with the code.

21 Claims, 20 Drawing Sheets

(56) References Cited

U.S. PATENT DOCUMENTS

| | | | |
|---|---|---|---|
| 6,782,080 B2 | 8/2004 | Leivo et al. | |
| 6,789,193 B1 | 9/2004 | Heiden | |
| 7,383,570 B2 | 6/2008 | Pinkas et al. | |
| 7,458,508 B1 | 12/2008 | Shao et al. | |
| 8,620,942 B1* | 12/2013 | Hoffman et al. | 707/766 |
| 2002/0049806 A1* | 4/2002 | Gatz et al. | 709/203 |
| 2003/0105966 A1 | 6/2003 | Pu et al. | |
| 2003/0126080 A1 | 7/2003 | Ogmen | |
| 2003/0177361 A1 | 9/2003 | Wheeler et al. | |
| 2003/0212891 A1 | 11/2003 | Evans et al. | |
| 2005/0273442 A1 | 12/2005 | Bennett et al. | |
| 2006/0106738 A1 | 5/2006 | Schleicher | |
| 2006/0294025 A1 | 12/2006 | Mengerink | |
| 2008/0028069 A1 | 1/2008 | Urbanek et al. | |
| 2008/0319875 A1 | 12/2008 | Levchin et al. | |
| 2008/0319899 A1 | 12/2008 | Levchin et al. | |
| 2009/0089182 A1 | 4/2009 | Light et al. | |
| 2009/0132273 A1 | 5/2009 | Boesch | |
| 2010/0077048 A1 | 3/2010 | Czyzewicz et al. | |
| 2010/0131409 A1* | 5/2010 | Lawyer et al. | 705/44 |
| 2010/0255861 A1 | 10/2010 | Raviv et al. | |
| 2011/0040592 A1 | 2/2011 | Kurtzig et al. | |
| 2011/0040662 A1 | 2/2011 | Kurtzig | |
| 2011/0040694 A1 | 2/2011 | Kurtzig et al. | |
| 2011/0041173 A1 | 2/2011 | Kurtzig et al. | |
| 2011/0047245 A1 | 2/2011 | Abramson et al. | |
| 2011/0055911 A1* | 3/2011 | Adelman et al. | 726/7 |
| 2011/0072039 A1 | 3/2011 | Tayloe | |
| 2011/0087705 A1 | 4/2011 | Swink et al. | |
| 2011/0125770 A1 | 5/2011 | Battestini et al. | |
| 2011/0161444 A1 | 6/2011 | Chauhan | |
| 2011/0179378 A1 | 7/2011 | Wheeler et al. | |
| 2011/0258024 A1 | 10/2011 | Prince | |
| 2011/0270751 A1 | 11/2011 | Csinger et al. | |

OTHER PUBLICATIONS

Google Association, Associate Email Addresses with your Google Account, Jan. 2008, Retrieved from the Internet <URL:blogoscoped.com/archive/2008-01-20-n36.html>, pp. 1-2 as printed.*

Ramachandran et al.; Authenticated Out-of-Band Communication Over Social Links; 2008; Retrieved from the Internet <URL:http://dl.acm.org/citation.cfm?id=1397749>; pp. 1-6 as printed.*

Ben Pickering; How to Run a Successful Social Media Contest; May 2011; Retrieved from the Internet <URL:socialmediaexaminer.com/how-to-run-a-successful-social-media-contest/>; pp. 1-6 as printed.*

* cited by examiner

AUTOMATED ENTITY VERIFICATION

CLAIM OF BENEFIT TO RELATED APPLICATIONS

This application claims the benefit of U.S. provisional application 61/505,738, entitled "Automated Entity Verification", filed Jul. 8, 2011. The contents of the provisional application 61/505,738 are hereby incorporated by reference.

TECHNICAL FIELD

The present invention pertains to systems, methods, and software products for performing automated entity verification.

BACKGROUND

Internet connectivity has enabled new means with which entities can communicate with one another. As used herein, an entity includes any individual or business, where agents or representatives of the business can communicate on its behalf. Such communication began with email, chat, and message boards. Today, social networking sites account for a large share of online communications. These communications include Facebook® messages and "wallposts" and Twitter® "Tweets™" as some examples.

In most instances, entities can register for and access communication services of different service providers while providing only a basic set of registration information. The basic set of registration information may include only a username or handle and an email address. This allows entities to register quickly, register anonymously, and avoid disclosing confidential information (e.g., social security number, credit card number, etc.).

However, such unverified usage can lead to spoofing, online identity hijacking, and credibility concerns. Specifically, an entity can obtain any available username or handle irrespective of whether that username or handle accurately identifies the entity or misleads others into believing that the entity is actually some other entity. The unverified nature with which many service providers operate makes it difficult or impossible to ascertain whether an online entity is who it claims to be. For example, John Smith can register for and create a Facebook profile "\GeorgeWashington" and the Twitter handle "@MicrosoftCorp" and begin disseminating messages using that profile and that handle. Due to the unverified status of the accounts, those receiving the messages sent from the "@MicrosoftCorp" handle have no way of knowing that the messages are not actually coming from the Microsoft Corporation but the entity, John Smith, that has registered for and used that handle. Unverified usage and the problems that result thereof are especially problematic (1) for broadcast type online communications such as Facebook public wallposts and Twitter tweets, whereby dissemination of information to large audiences can be easily accomplished, and (2) for celebrities, politicians, athletes, and others in the public eye who are often the targets of spoofing and online identity hijacking and whose communications are followed by others.

Some attempts have been made to verify entities and entity accounts. However, these attempts have mostly involved manual processes. Manual processes are costly and slow. For a service provider with several thousands or millions of unverified registered entities, a manual entity verification process is not viable. Other attempts at entity verification have required entities to disclose confidential information. Some entities shy away from such verification processes because of the confidential nature of the information that is being requested and because of fear that the confidential information may be hacked and stolen from the service provider.

As service providers attract more users, as the services provided to the unverified entities reach and impact larger audiences, and as the services provided to the unverified entities are turned to by more entities as an increasingly important source from which to obtain information or news about an entity, an ever increasing need results to automatedly and accurately verify the identities of the entities so that content consumers can be confident that a disseminating entity is who it claims to be and the disseminated information or news can be relied upon as coming from the appropriate source. Accordingly, there is a need to provide improved automated systems, methods, and techniques for performing entity verification. There is need to perform such entity verification in a manner that keeps up with service providers receiving exponential growth. There is further a need to perform such verification based on the basic registration information that can be obtained from the service providers, without the need for the entities to disclose additional confidential information.

SUMMARY OF THE INVENTION

It is an object of the present invention to define systems, methods, and computer software products to perform automated entity verification. It is an object of the automated entity verification to verify (1) that a particular entity has access to or controls an account that is registered at a service provider and (2) that the particular entity is who it claims to be by being able to respond to communications that are sent to the particular entity using contact information that was previously verified as belonging to the particular entity. It is further an object to perform such automated entity verification with minimal information from the unverified entity or service provider so as to avoid requesting confidential information from the unverified entity or service provider and so as to avoid verifying the entity based on falsified or misrepresented information provided by the unverified entity or falsified or misrepresented information that was provided to the service provider. In this manner, entities can continue to utilize services provided by the service providers without change and verification can be automatedly performed with minimal interaction by the entity and with little to no impact on the service provider.

Some embodiments provide an automated entity verification system (hereinafter referred to as the verification system) that communicably couples with one or more service providers and one or more entity record databases. The service providers provide various services (e.g., communication, transactional, etc.) to entities that are registered with and access services of the service providers through unverified accounts. Some such service providers include Facebook, Twitter, LinkedIn®, and Google+™ as some examples. The entity record databases are populated by trusted information aggregators and contain previously verified information about different entities including individuals and businesses. The databases maintained by Dun & Bradstreet®, Dun & Bradstreet Credibility™, LinkedIn, and MyLife.com® are representative of entity record databases with which the verification system is communicably coupled. Verified information contained within the entity record databases include verified names, addresses, telephone numbers, email addresses, Uniform Resource Locators (URLs), etc. for different entities.

To perform the automated verification, the verification system obtains entity account information for entities that have not yet been verified. The entity account information may include proper names, usernames, handles, email addresses, and/or other basic information (e.g., telephone number, mailing address, etc.) that an entity uses to register an account at a particular service provider. In some embodiments, the entity account information is provided directly by an unverified entity to a graphical user interface (GUI) of the verification system. In some embodiments, the verification system obtains the entity account information from a service provider.

The verification system matches the obtained entity account information against information stored to different records of one or more of the entity record databases. The matching involves retrieving entity records with information that matches the entity account information to a specified threshold degree as determined by one or more of equivalence matching, phonetic matching, permutation matching, and other matching algorithms. For example, matching may include identifying entity records that include names for entities that most closely match to an individual or business name that is included as part of the obtained entity account information or identifying entity records that include usernames/handles or individual/business names for entities that most closely match to an account username/handle that is included as part of the obtained entity account information.

In some embodiments, entity names are extracted from the matched entity records and presented to the entity for selection via a GUI of the verification system or a GUI of the service provider. The entity selects its entity name from the presented list and the verification system obtains the entity record that is associated with the selected entity name from the entity database. The obtained entity record includes previously verified information for the entity. As noted above, the previously verified information includes verified contact information for the entity including one or more of verified telephone numbers, email addresses, and mailing addresses as some examples.

Based on the obtained entity account information and the verified contact information in the obtained entity record, the verification system performs a two part verification campaign. One part of the verification campaign, also referred to as account ownership authentication, serves to verify that the entity is the true owner of the entity account to be verified. Another part of the verification campaign, also referred to as entity authentication, serves to verify that the entity is who it claims.

In some embodiments, account ownership authentication involves the verification system passing a first verification code to a registered account of the unverified entity at a service provider. The account is identified from the obtained entity account information or by requesting the user to input an account identifier (e.g., username, handle, etc.) to a GUI of the verification system. The first verification code is passed using a messaging format that is supported by the service provider. For example, this includes passing a Facebook message for a Facebook identified account and passing an email message for a Google+ identified account. The entity receiving the message returns the first verification code to the verification system to verify that it has control or access over the registered account. If the entity receiving the message did not request verification for its account, then it is revealed that another is attempting to impersonate or falsely represent itself as the entity and the entity can take appropriate action with the service provider.

In some other embodiments, account ownership authentication involves having an entity associate an account that it has registered at a particular service provider to an account that the verification system has registered at the particular service provider. When the particular service provider is Twitter, the entity association involves having the entity "follow" a verification system registered Twitter account from the entity registered Twitter account. When the service provider is Facebook, the entity association involves having the entity submit a "friend request" from its registered Facebook account to a registered Facebook account of the verification system. It should be apparent that the verification system supports other forms of association for performing account ownership authentication with the above enumerated service providers and other service providers (e.g., Google+, LinkedIn, etc.). The verification system monitors for the association during a particular interval. Should the association occur within the interval, the verification system verifies that the entity is the true owner of the entity account that is registered with the service provider. If the association does not occur within the interval, then the entity is either not the true owner of the entity account that is registered with the service provider or the entity did not perform the association in time and will have to repeat the process. In this manner, account ownership authentication step prevents an entity from being able to verify an account that it has no access to or no control over.

Some service providers do not allow the verification system to directly send the message with the first verification code to an account of a registered entity without an association existing beforehand. In such cases, the account ownership authentication is performed by first having the entity associate an account that it has registered at a service provider with an account the verification system has registered at the service provider. The verification system monitors for the association. Once the association occurs, the verification system then sends a message with the first verification code to the account of the entity. Upon successfully retrieving the message with the first verification code from the entity account, the entity returns the first verification code to the verification system to verify that the entity has access to or control over the account.

To perform the second part of the verification campaign or entity authentication, the verification system automatedly disseminates a communication with a second verification code to the entity using a verified form of contact that is extracted from the obtained entity record. The communication occurs using a different form of communication than that used for the first part of the verification campaign, account ownership authentication. Specifically, the communication occurs using a telephone call, a text or SMS message, an email, or a physical mailing. The verification system then monitors for a reply communication with the second verification code from the entity. Entity authentication prevents a first entity from falsely representing that an account belongs to, is associated with, or is representative of a second entity. More specifically, entity authentication, serves to verify that the entity is who it claims to be by verifying that the entity can respond to messages that are sent to methods of contact that have been previously verified as belonging to the entity. By obtaining contact information directly from the obtained entity record of the entity database and not from information that was provided to the service providers or from information that was directly provided by the unverified entity, account impersonators, hijackers, and spoofers will be unable to receive the second verification code and will thus be unable to verify the impersonated, hijacked, or spoofed accounts. Moreover, the correct authoritative entity will receive the communication and the authoritative entity can then take any corrective action with a service provider to ban, restrict, or otherwise remedy accounts registered at the service provider that could be used to impersonate or represent the authoritative entity.

Entity verification is complete when the entity provides both the first and second verification codes to the verification system or when the entity successfully associates its account with the verification system and the verification system receives the second verification code from the entity. Upon successful verification of an entity, the verification system conveys the verified status of the entity to one or more service providers with which the verified entity is registered. The service providers can then place a verification badge next to the handle, username, or account of the verified entity to indicate the verified status of the entity to other users of the service provider.

In some embodiments, the verification system performs a reverse verification process whereby the verification system starts the entity verification process by first obtaining a set of entity records from one or more entity record databases. The verification system then matches the verified information from the entity records to entity account information of one or more service providers. For example, the verification system obtains the entity record that contains the verified business name "Acme Lights Inc." and the verification system performs the reverse matching process to match that entity record to the service provider account handle "AcmeLightBulb". Once a match is made to a sufficient degree, the verification system performs the two part verification campaign described above or a modified verification campaign using the contact information from the entity record to verify whether the matched account (e.g., username and handle) belongs to the entity that is identified within the entity record.

In some embodiments, the verification system operates independent of service provider provided entity account information. In some such embodiments, the verification system directly obtains a set of entity records from one or more entity record databases. Next, the verification system leverages the verified contact information within the obtained set of entity records to perform a modified verification campaign that requests the receiving entities to identify different accounts that they use with different service providers. For example, an entity responds to the modified verification campaign by identifying that the email domain "@mybusiness.com", the Twitter handle "@MyBusinessCorporate", and the Facebook username "www.facebook.com/mybusinessis#1" belong to that entity. Using this information, the verification system contacts the appropriate service providers to automatically verify the appropriate accounts.

In some embodiments, the verification system automatedly verifies entities with an offline presence. This may include verifying a business storefront by verifying that the business has accurately represented itself to business registration databases including, for example, the secretary of state.

BRIEF DESCRIPTION OF THE DRAWINGS

In order to achieve a better understanding of the nature of the present invention a preferred embodiment of the automated entity verification systems and methods will now be described, by way of example only, with reference to the accompanying drawings in which.

DETAILED DESCRIPTION OF THE INVENTION

Figure 1:
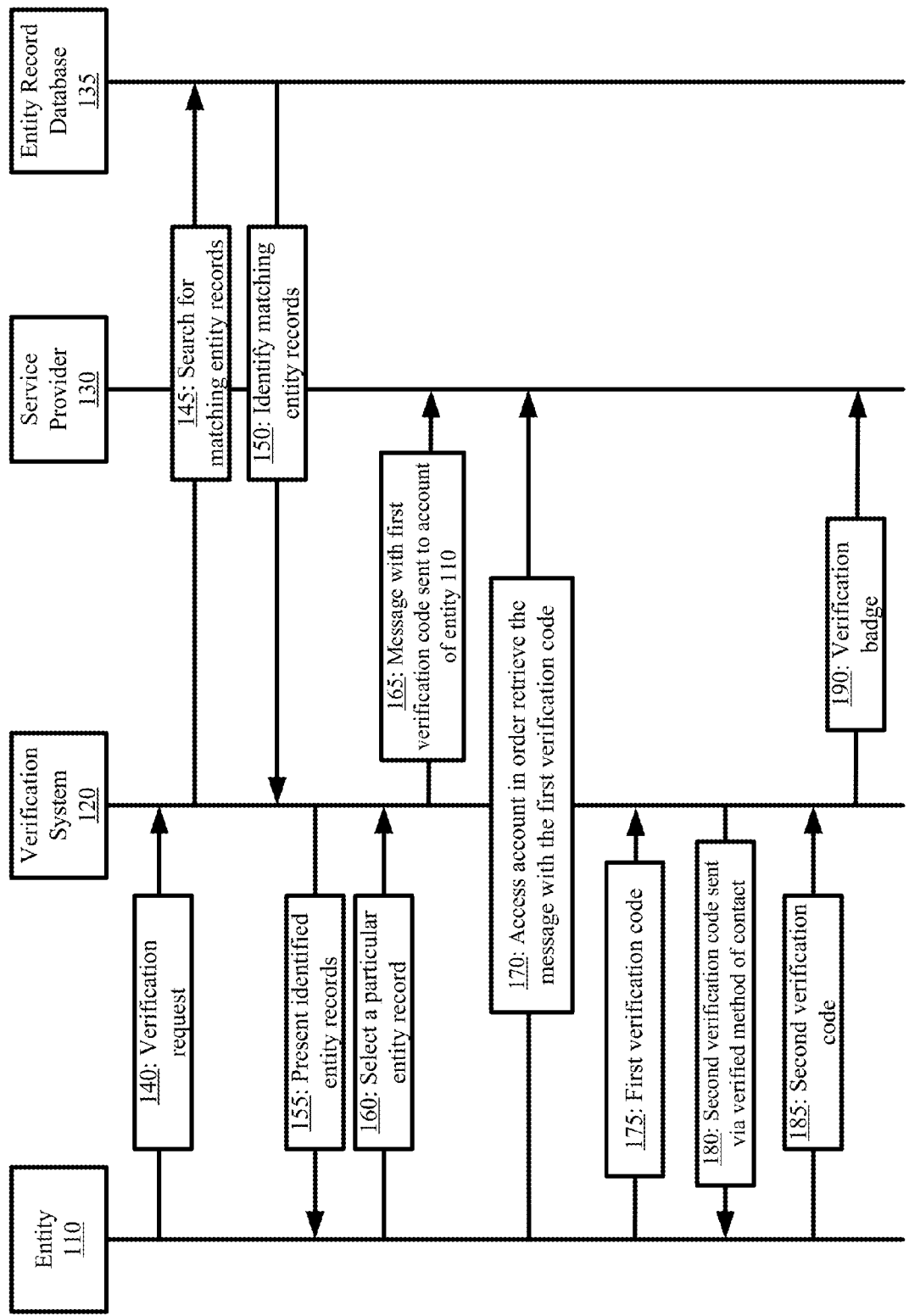
FIG. 1 conceptually illustrates the verification system performing an automatic entity verification method that is in accordance with some embodiments.

In the following detailed description, numerous details, examples, and embodiments of automated entity verification systems and methods are set forth and described. As one skilled in the art would understand in light of the present description, the systems and methods are not limited to the embodiments set forth, and the systems and methods may be practiced without some of the specific details and examples discussed. Also, reference is made to the accompanying figures, which illustrate specific embodiments in which the systems and methods can be practiced. It is to be understood that other embodiments can be used and structural changes can be made without departing from the scope of the embodiments herein described.

To facilitate the discussion, a service provider is any online or Internet based service with which entities can register with to obtain an account that enables some form of communication with other registered entities. Entities can register with the service provider using a basic set of information (e.g., username or handle and email address) in an unverified manner. Unverified registration includes registering an account with a service provider using information that the service provider does not verify. Twitter, Facebook, Google+, MySpace®, Bebo®, Flickr®, LiveJournal®, and email services (e.g., Gmail®, Yahoo!®, etc.) are representative of some service providers that allow entities to register accounts with unverified information. Service providers typically operate independent of the verification system described herein and utilize the verification system as a third party service. However, the verification system of some embodiments can be integrated with each of the service providers as an integrated component or service of the service providers.

An entity record database is a database that is operated and maintained by an information aggregator that aggregates and verifies data pertaining to entities including businesses and individuals. An entity record of the entity record database may store verified identification information (e.g., business names or individual names), verified names of principals for a business, verified street addresses, verified email addresses, and verified telephone numbers that are associated with an entity. The entity records can be populated with other verified information such as financial records, credit history, legal history, etc. The entity records are commonly used by credit reporting agencies (e.g., Dun & Bradstreet, TransUnion®, etc.), financial reporting agencies (e.g., EDGAR, US Securities and Exchange Commission, etc.), regulatory agencies (e.g., Secretary of State), and other agencies (e.g., the Better Business Bureau®) to facilitate various commercial transactions (e.g., lending credit, identifying creditworthiness, identifying trade references, etc.). Dun & Bradstreet, LinkedIn, and MyLife.com are representative of information aggregators that operate and maintain entity record databases. In some embodiments, the entity record database is operated and maintained by the verification system or a third party that the verification system is communicably coupled with.

I. Automated Entity Verification

Some embodiments provide an automated entity verification system (hereinafter referred to as the verification system) that communicably couples with one or more service providers and one or more entity record databases to perform automated entity verification. FIG. 1 conceptually illustrates the verification system performing an automatic entity verification method that is in accordance with some embodiments. The figure includes entity 110, verification system 120, service provider 130, and entity record database 135. The verification system 120 is communicably coupled to the service provider 130 and entity record database 135 in order to remotely access data from the databases of the service provider 130 and the entity record database 135. Various pre-established partnership agreements facilitate the coupling of the verification system 120 with the service provider 130 and the entity record database 135. A single entity 110, a single service provider 130, and a single entity record database 135 are shown in FIG. 1 for purposes of simplicity and clarity. However, it should be apparent to one of ordinary skill in the art that the verification system 120 is scalable to communicably couple with several service providers and entity record databases, and to provide automated verification for several entities at the same time.

In some embodiments associated with FIG. 1, the automated entity verification method commences when the entity 110 submits (at 140) a verification request to the verification system 120. The verification request is a request to verify the entity 110 at the service provider 130. More specifically, the verification request is a request to verify that an account that is registered with the service provider 130 is used by the entity 110 and the messages and communications originating from that account represent messages and communications originated by the entity 110. In some embodiments, the entity 110 submits the verification request with entity account information. Entity account information may include a username or handle that the entity 110 has registered with the service provider 130 and that is unverified. Entity account information may alternatively or additionally include a business name or individual name of the entity 110, mailing address, email address, telephone number, or other identifier that can be used to identify the entity 110. In some embodiments, the entity 110 accesses a graphical user interface (GUI) of the verification system 120 to specify the entity account information that is included with the verification request. The GUI is accessible via a data network (i.e., the Internet) by directing a web browser client executing on a networked device to a Uniform Resource Location (URL) or hostname of the verification system 120 (e.g., www.verificaitonsystem.com).

Figure 2:
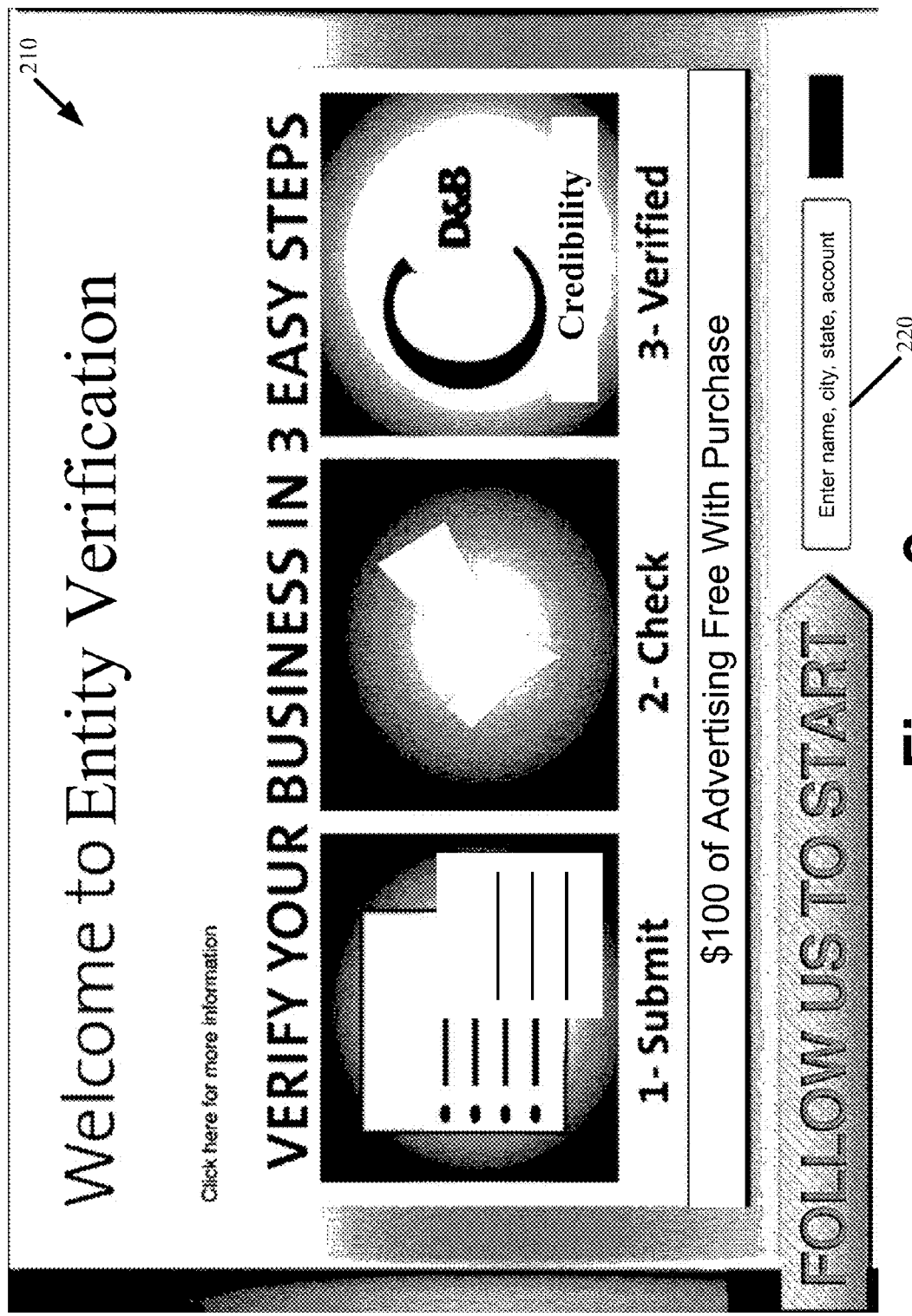
FIG. 2 illustrates an exemplary interactive GUI of the verification system that entities can access in order to specify the entity account information and submit a verification request.

FIG. 2 illustrates an exemplary interactive GUI 210 of the verification system 120 that entities can access in order to specify the entity account information and submit a verification request. As shown, the GUI 210 includes a text entry box 220 into which an entity can specify a username, handle, business name, individual name, or other identifier used as the entity account information. The GUI 210 is specific to verifying accounts registered with the service provider Twitter. It should be apparent to one of ordinary skill in the art that different GUIs can be provided for different service providers or that a single GUI can be provided with an option for the user to specify which service provider the entity has an account registered with that needs to be verified.

Instead of using the GUI 210 to obtain the entity account information, some embodiments of the verification system 120 receive verification requests directly from the service provider 130. In some such embodiments, the service provider 130 automatically attempts to verify the entity 110. For instance, the service provider 130 may provide a verification option (e.g., button, checkbox, etc.) through one of its GUIs that the entity 110 can invoke in order to cause the entity account information for the entity 110 to be sent from the service provider 130 to the verification system 120. In some embodiments, the service provider 130 automatically provides the entity account information for the entity 110 to the verification system 120, for example, when the entity 110 registers a new account with the service provider 110 or when an account of the entity 110 is to be used in conjunction with a particular service of the service provider 130 that requires the entity 110 to be verified prior to accessing that particular service.

Upon receiving the verification request at 140, the verification system 120 uses the received entity account information in the verification request to identify one or more entity records from the entity record database 135. To do so, the verification system 120 submits (at 145) a query to the entity record database 135 to identify one or more entity records that match to a specified threshold level with the entity account information. Various data pruning, data cleansing, data normalization, and data matching techniques are used to identify (at 150) the appropriate entity records from the entity record database 135 that match to the specified threshold level and to provide the identified entity records to the verification system 120. Such pruning, cleansing, normalization, and matching techniques are well established in the art and implemented as part of various Master Data Management (MDM) solutions which are incorporated herein by reference. Some matching techniques may perform equivalence matching, phonetic matching, and permutation matching as some examples. The matching identifies entity records that include names for entities that most closely match to an individual or business name that is provided as part of the verification request or entity records that include usernames/handles or individual/business names for entities that most closely match to an account username/handle that is provided as part of the verification request. For example, when the entity account information in the verification request specifies the business name "Acme Inc.", the entity records for entities "Acme Corporation", "Acme Limited", "Acme Professional Services", and "Accmme Inc." may match by the specified threshold and thus be identified by the entity record database 135. Similarly, when the entity account information includes the service provider handle "@AcmeInc.", the entity records for the same set of entities may be identified as matching by the specified threshold to the entity names within the entity records. In order to assist and improve the accuracy of the matching, some embodiments further obtain and utilize messages that are sent from and received by the unverified entity account. Such messages are then used to filter the identified entities. For example, the obtained entity account information may include the handle "@AcmeInc" and the identification performed at 150 may identify four different entity records that match the handle "@AcmeInc" by the specified threshold. Next, tweets or other messages sent from and received by the entity account are obtained from the service provider 130 and are processed to extract elements that can potentially narrow the match to a single entity record from the four entity records. For example, when a message identifies a particular geographic region, then the matching process can include the geographic identifier (e.g., zipcode, city, state, etc.) when identifying the best matching entity record from the entity record database 135. In some embodiments, the closest matching entity records are sorted based on relevance factors. The relevance factors may include the number of years a business entity has been in operation, the number of employees of the business entity, and the revenue of the business entity. Such information is present within the entity records as the entity records may include organizational and financial data from sources such as Dun & Bradstreet, LinkedIn, etc.

Figure 3:
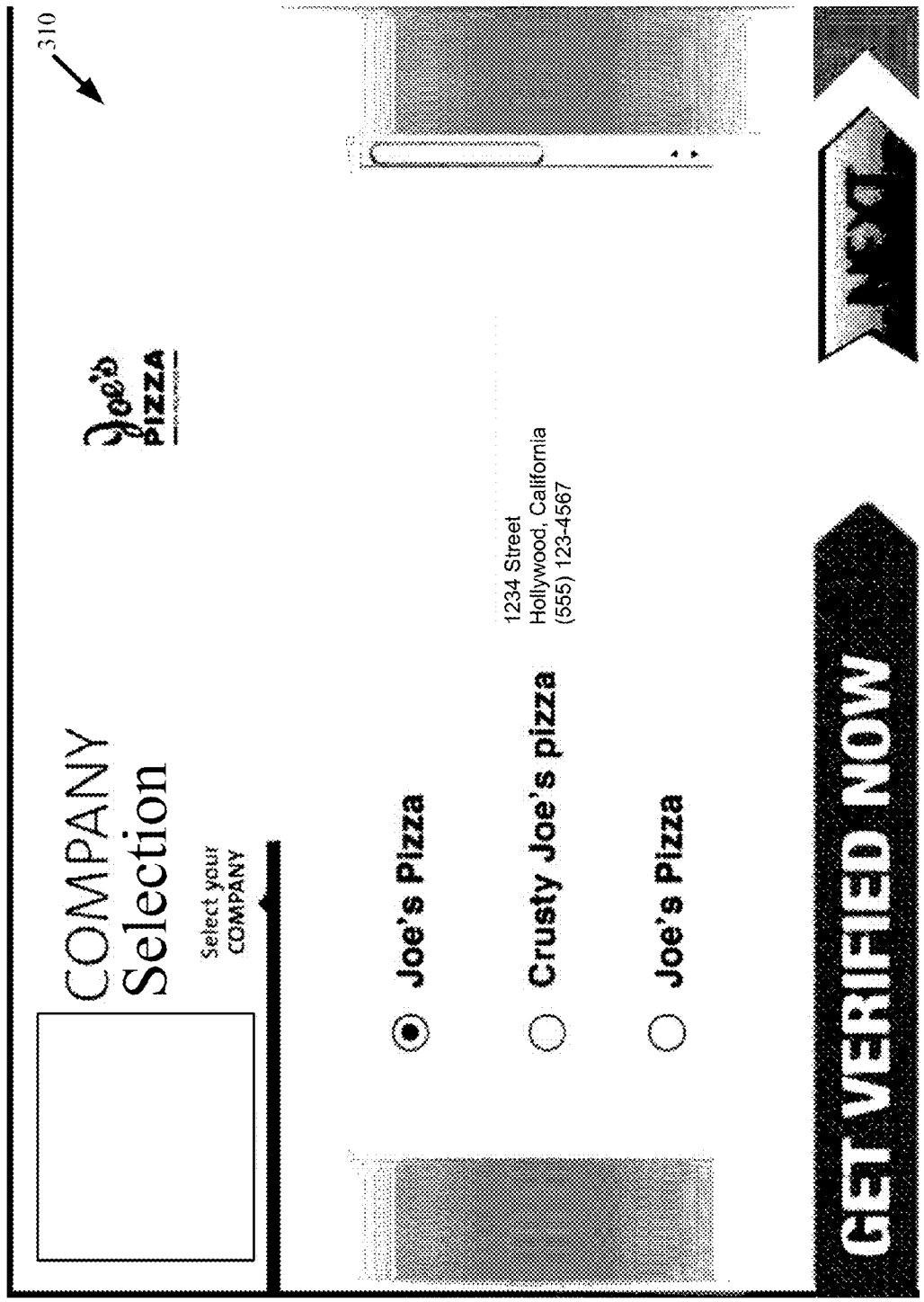
FIG. 3 illustrates an exemplary GUI for presenting entity names from an identified list of matching entity records to the entity for selection.

Entity names are extracted from the matched and/or sorted entity records and presented (at 155) to the entity 110 for selection via a GUI of the verification system 120 or optionally via a GUI of the service provider 130. FIG. 3 illustrates an exemplary GUI 310 for presenting entity names from an identified list of matching entity records to the entity 110 for selection. The entity 110 selects (at 160) its entity name from the presented list to then cause the verification system 120 to obtain the entity record associated with the selected entity name and to perform a verification campaign to verify the entity 110. In some embodiments, when a single entity record is matched with a sufficiently high degree of accuracy (i.e., over 90%), the verification system 120 may present the entity name associated with the single entity record for the entity 110 to confirm or may omit performing steps 155 and 160. In some embodiments, if a matching entity record cannot be identified based on the available account information and other supplemental data, automated entity verification for that particular entity is not performed or the verification is suspended until additional information is made available to result in an entity record match.

The verification system 120 performs the verification campaign in two parts. One part of the verification campaign, referred to as account ownership authentication, serves to verify that the entity 110 is the true owner of an unverified entity account that is registered with the service provider 130. Specifically, account ownership authentication involves the verification system 120 verifying that the entity 110 has access or control over the registered entity account. Another part of the verification campaign, referred to as entity authentication, serves to verify that the entity 110 is who it claims to be by verifying that the entity 110 can respond to communications that are sent to methods of contact that have been previously verified as belonging to the entity 110. The two parts of the verification campaign may be performed simultaneously or sequentially in any order. It is therefore irrelevant which part of the verification campaign is performed first. For exemplary purposes, FIG. 1 illustrates performing account ownership verification before performing entity authentication.

Figure 4:
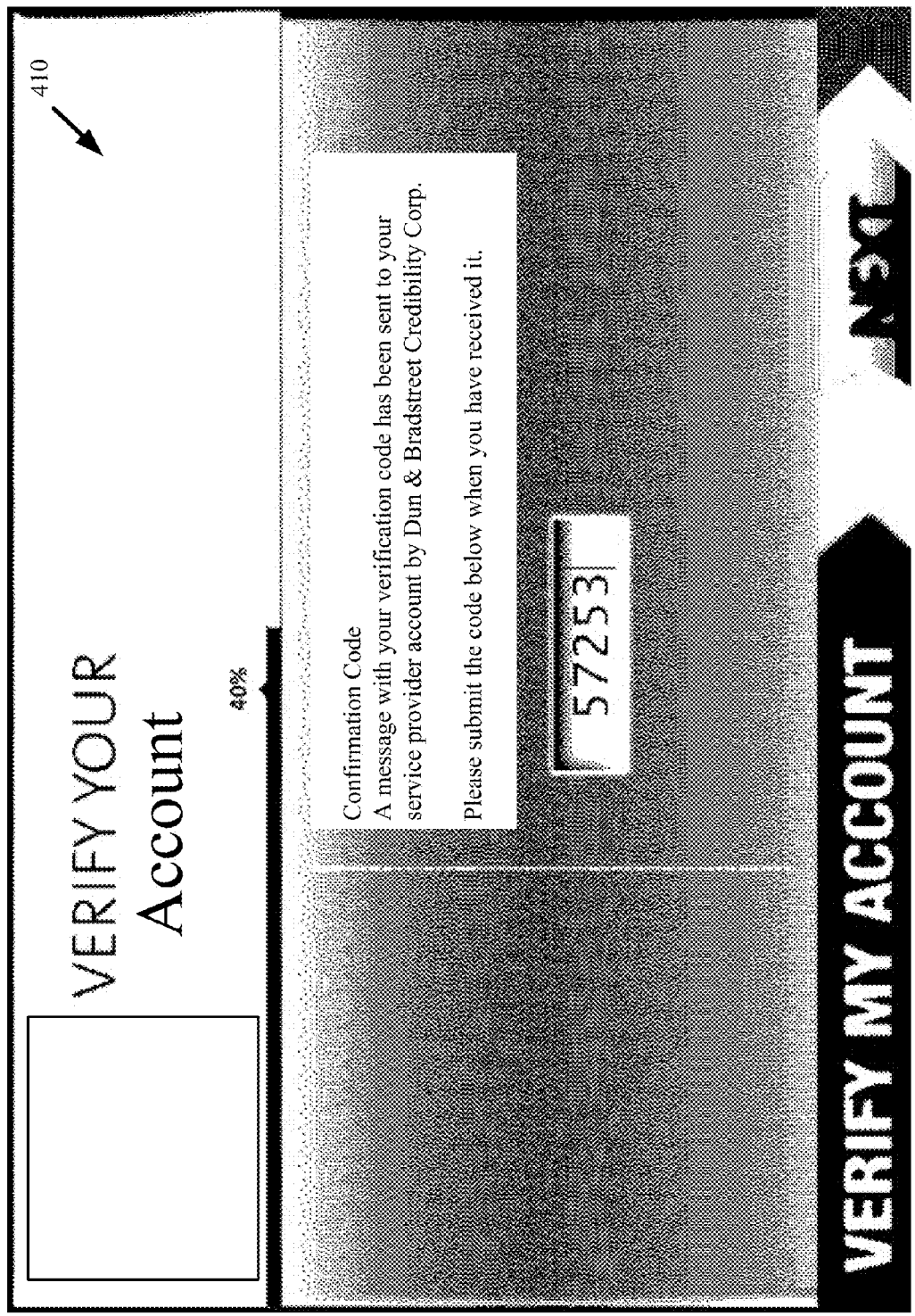
FIG. 4 presents an exemplary GUI for notifying the entity that the message with the first verification code has been sent to the particular entity account at the service provider and for the entity to enter the first verification code upon receiving the message.

As part of account ownership verification, the verification system 120 dynamically generates a first verification code and sends the first verification code to a particular account that the entity 110 has registered with the service provider 130 in order to verify that the entity 110 has access to or control over that particular account by having the entity 110 receive and return the first verification code back to the verification system 120. In some embodiments, the first verification code is a numeric value or an alphanumeric value. The first verification code is uniquely associated with the particular account of the entity 110 such that the first verification code can only be used to verify that particular account. In some embodiments, the verification system 120 identifies the particular entity account to send the first verification code to from a username, handle, or other identifier that is included in the verification request that is sent at 140. When the verification request does not include the username, handle, or other identifier for the particular entity account, the verification system 120 presents a GUI that requests the entity 110 to provide the username, handle, or other identifier for the particular entity account. The verification system 120 then passes (at 165) the first verification code in a message to the particular entity account that is registered at the service provider 130. In some embodiments, the message includes instructions to instruct the entity 110 to return the first verification code to the verification system 120 to verify that it has access to or control over the particular entity account. The entity 110 is notified of the sent message in a GUI that is presented after an entity record is selected using the GUI 310 of FIG. 3. FIG. 4 presents an exemplary GUI 410 for notifying the entity 110 that the message with the first verification code has been sent to the particular entity account at the service provider 130 and for the entity 110 to enter the first verification code upon receiving the message. The first verification code is passed using a messaging format that is supported by the service provider 130 at which the particular entity account is registered. For example, this includes passing a Facebook message for a Facebook identified account and passing an email message for a Google+ identified account. The message containing the first verification code is passed from an account that the verification system 120 has registered at the service provider 130.

The entity 110 then accesses (at 170) its account at the service provider 130 in order retrieve the message with the first verification code. It should be evident that the entity 110 will only be able to the access the message if it has access to or control over the entity account. This prevents the entity 110 from verifying accounts that belong to others. Upon accessing the message, the entity 110 extracts the first verification code from the message and provides (at 175) the first verification code back to the verification system 120 to complete the account ownership authentication part of the verification campaign. To provide the first verification code, the entity 110 may enter the first verification code in the GUI 410 of FIG. 4. The message passed at 165 may include a hyperlink that directs the entity 110 to the GUI 410. The message passed at 165 may include other instructions for how the entity 110 can return the first verification code to the verification system 120, for example, by replying to the message and entering the first verification code in the subject line or body of the reply message. Upon receiving the first verification code at step 175, the verification system 120 proceeds to perform the second part of the verification campaign, entity authentication.

Entity authentication is performed to verify that the entity 110 is who it claims to be. This part of the automated entity verification is performed by verifying that the entity 110 is able to receive and respond to communications that are issued to previously verified contact information for the entity 110. As part of entity authentication, the verification system 120 dynamically generates a second verification code. The second verification code is uniquely associated with the entity 110 such that the same verification code is not generated for other entities seeking verification. Next, the verification system 120 selects a communication method to submit the second verification code to the entity 110. The available methods of communication are determined based on verified contact information that is present within the entity record selected at 160. As noted above, entity records include one or more of a verified street address, email address, and telephone number that have been independently verified at some prior instance in time as belonging to the entity 110 and that can be used to contact the entity 110. In some embodiments, the entity 110 is presented with a GUI to select a preferred method of contact based on the verified contact information that is available in the selected entity record obtained from the entity record database 135. If the individual attempting to verify an entity account is falsely representing itself as the entity 110, then that individual will be unable to receive and respond to the communication, thereby causing the entity verification to fail.

Figure 5:
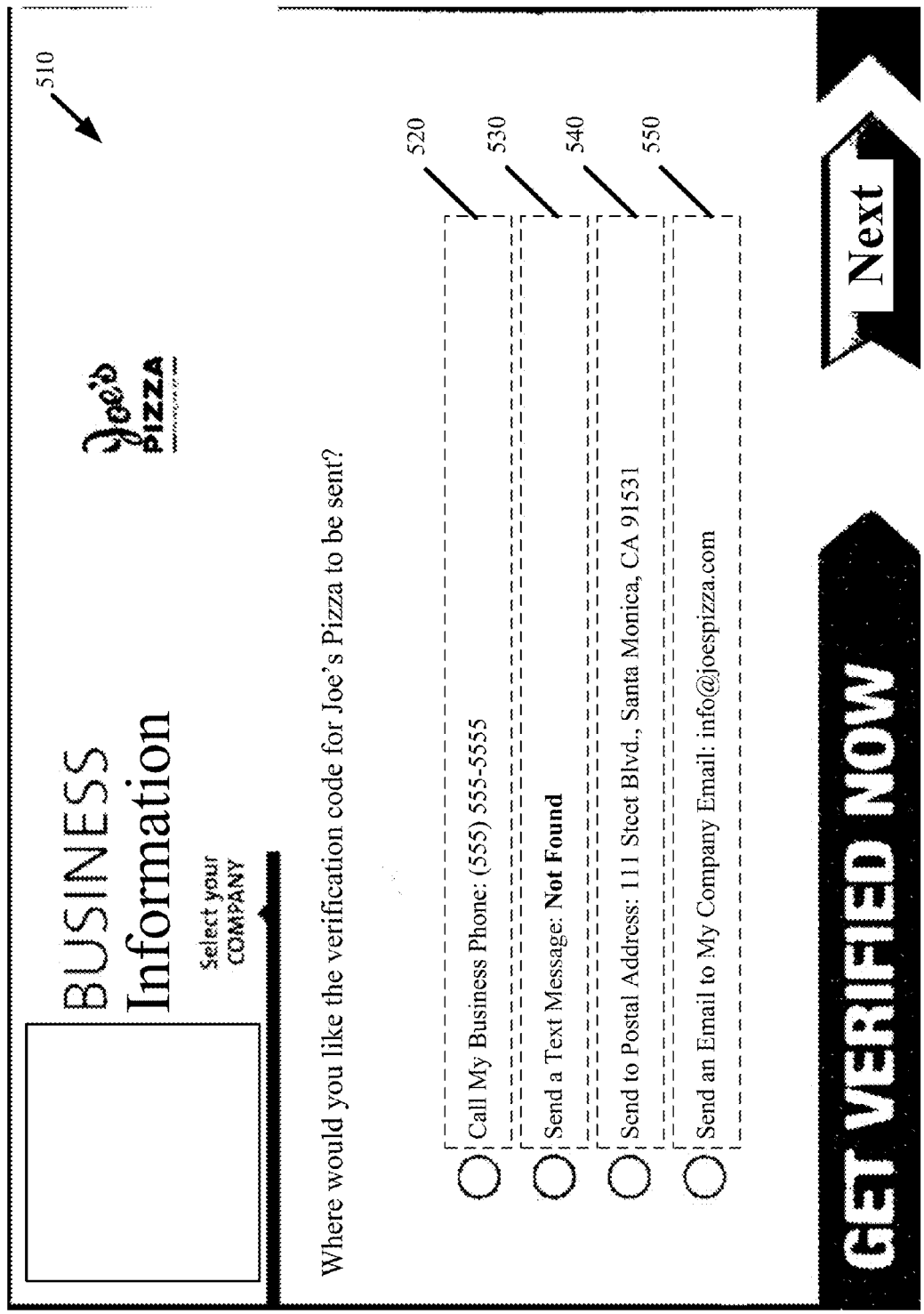
FIG. 5 illustrates an exemplary GUI to allow an entity to select a preferred method of contact in accordance with some embodiments.

FIG. 5 illustrates an exemplary GUI 510 to allow an entity to select a preferred method of contact in accordance with some embodiments. As shown in FIG. 5, the methods of contact include calling a verified telephone number 520, text messaging or sending a Short Messaging Service (SMS) message to a telephone number 530, sending a physical mailing to a street address 540, or sending an email to an email address 550. The methods of contact may be dynamically populated in the GUI 510 based on the methods of contact that have been verified and stored to the entity record selected at step 160.

At 180, the verification system 120 disseminates a communication that includes the second verification code to the entity 110 using the preferred communication method. The communication may also include instructions for how the receiving entity can complete the verification process using the second verification code provided in the communication. When the communication is an email or text message, the instructions may include a hyperlink to a GUI of the verification system 120 in which the entity 120 can enter the second verification code. In some embodiments, the communication disseminated to the entity 110 includes various safeguards that restrict access to the second verification code until a set of confidential questions are successfully answered by the entity. The questions may be derived from other fields of the matched entity record. For example, the questions may request a receiving entity to first provide the last four digits of his/her social security number and a date of birth before being presented the second verification code. Such questions may be presented through a website, email containing an embedded script, or audible prompts.

Figure 6:
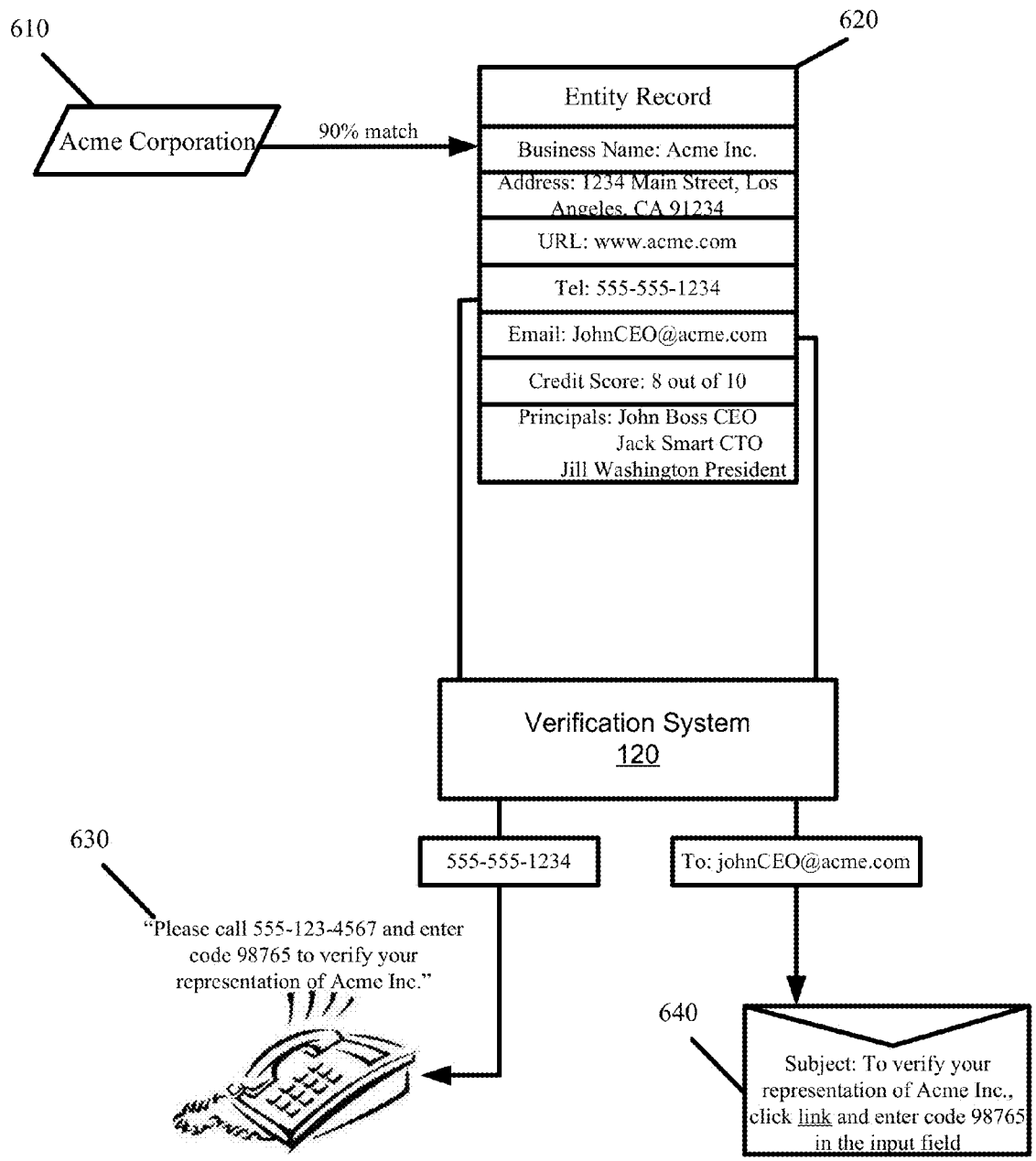
FIG. 6 conceptually illustrates the verification system disseminating the communication using an audible message and an email in accordance with some embodiments.

FIG. 6 conceptually illustrates the verification system 120 disseminating the communication using an audible message and an email in accordance with some embodiments. The figure includes receiving entity account information 610, entity record 620 that is matched and identified based on the entity account information 610, the verification system 120, and communication as represented by audible message 630 and email 640 sent from the verification system 120 to an entity.

In FIG. 6, the entity account information 610 specifies a business name. Evidently, the business name alone is insufficient to perform entity verification. However, the business name matches to one or more fields of the entity record 620 by the specified threshold degree. Accordingly, when the verification system 120 forwards the business name to the entity record database, the entity record database returns the entity record 620. The verification system 120 then uses the contact information contained in the entity record 620 to conduct the verification campaign. Specifically, the verification system 120 generates the second verification code and disseminates the second verification code via the audible message 630 using the verified telephone number from the entity record 620 and via the email 640 using the verified email address from the entity record 620. Each disseminated message 630 and 640 includes instructions for how to complete the registration. For instance, the audible message 630 specifies the second verification code and a telephone number of the verification system 120 that the entity can dial in order to provide the second verification code back to the verification system 120 for completion of the entity verification; the email 640 includes the second verification code and an embedded link that when invoked, directs a web browser to a web site of the verification system 120 that contains a field in which the entity can enter the second verification code in order to complete the entity authentication part of the verification campaign.

With reference back to FIG. 1, the entity 110 returns (at 185) the second verification code it received in the communication to the verification system 120. If the verification code is properly returned to the verification system 120, then the entity 110 is a valid representative of the entity identified in the selected entity record by virtue of the fact that the entity 110 was able to receive and respond to the communication that was sent using a method of contact that was previously verified for the entity 110.

After the first and second verification codes are returned by the entity 110 to the verification system 120, the verification system 120 verifies the entity 110 and notifies (at 190) the service provider 130 of the verification. For example at 190, the verification system 120 passes a verification badge to the service provider 130 for the service provider 130 to include alongside the account of the entity 110 so that other entities transacting with the verified entity 110 can be assured that the verified entity 110 is who it claims to be at the service provider 130 site. In other words, the verification badges are used to distinguish verified entities from unverified entities on the service provider 130 site.

Figure 7:
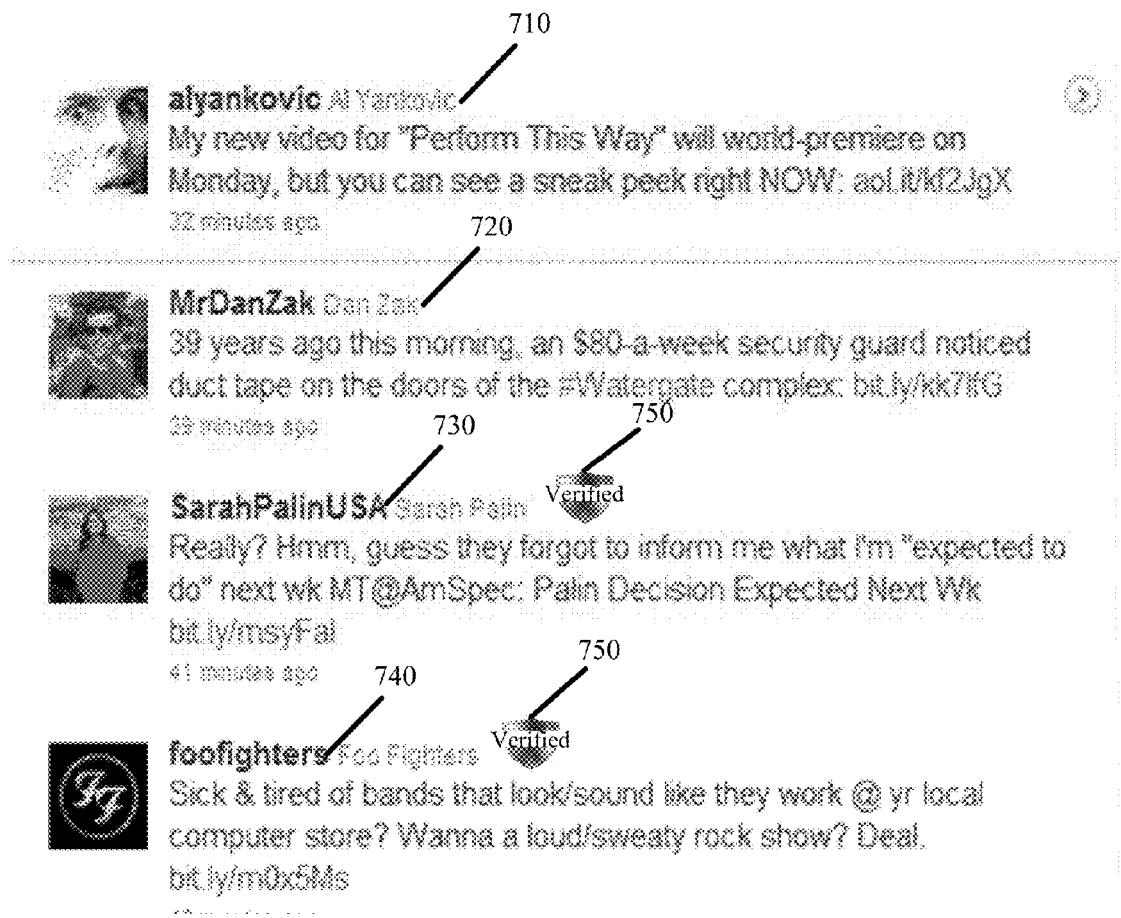
FIG. 7 illustrates placement of the verification badge on a service provider page in accordance with some embodiments.

FIG. 7 illustrates placement of the verification badge on a service provider page in accordance with some embodiments. Specifically, FIG. 7 illustrates a service provider page that includes messages from four different entities 710, 720, 730, and 740, wherein entities 730 and 740 have been verified and include the verification badge 750 placed next to their corresponding entity handle. From the verification badge 750, other entities know that entities 730 and 740 are who they claim to be and that tweets and other communications issued by the entities 730 and 740 are reliable and can be trusted as having been originated by individuals or business represented by the entities 730 and 740. In some embodiments, the verification badge can be clicked on or a point tool can be placed over the verification badge to reveal additional information about the verified entity such as a verified name, telephone number, address, etc. This additional information may be populated from the entity record that is selected and associated with the verified entity.

In view of the foregoing, it should be apparent that the verification process is automated, secure, and prevents others from being able to verify an account that does not belong to them or that is being used to falsely represent an entity's identity. This is because of the two part verification campaign described above. Specifically, verification can only be completed by an entity that (1) has access to an entity account at a service provider and (2) can receive and respond to communications submitted using contact information that third party information aggregators, such as Dun & Bradstreet, have previously verified for that entity (for purposes of gathering business information, credit ratings, credibility ratings, etc).

It should be noted that the verification system 120 of some embodiments is a centralized system that is used by multiple service providers. As such, the same badges can be placed on accounts and sites of different service providers, thereby creating a recognizable symbol that entities can trust irrespective of which service provider they access. In some embodiments, the verification badge contains branding of the service provider or the verification system. In some embodiments, the verification system charges a fee to verify one or a set of entities for a service provider. Additionally or alternatively, the verification system may charge a fee to each entity that is verified. Verification may be provided as a subscription service whereby entities are re-verified on a periodic basis. For example, entities are verified on a yearly basis.

Figure 8:
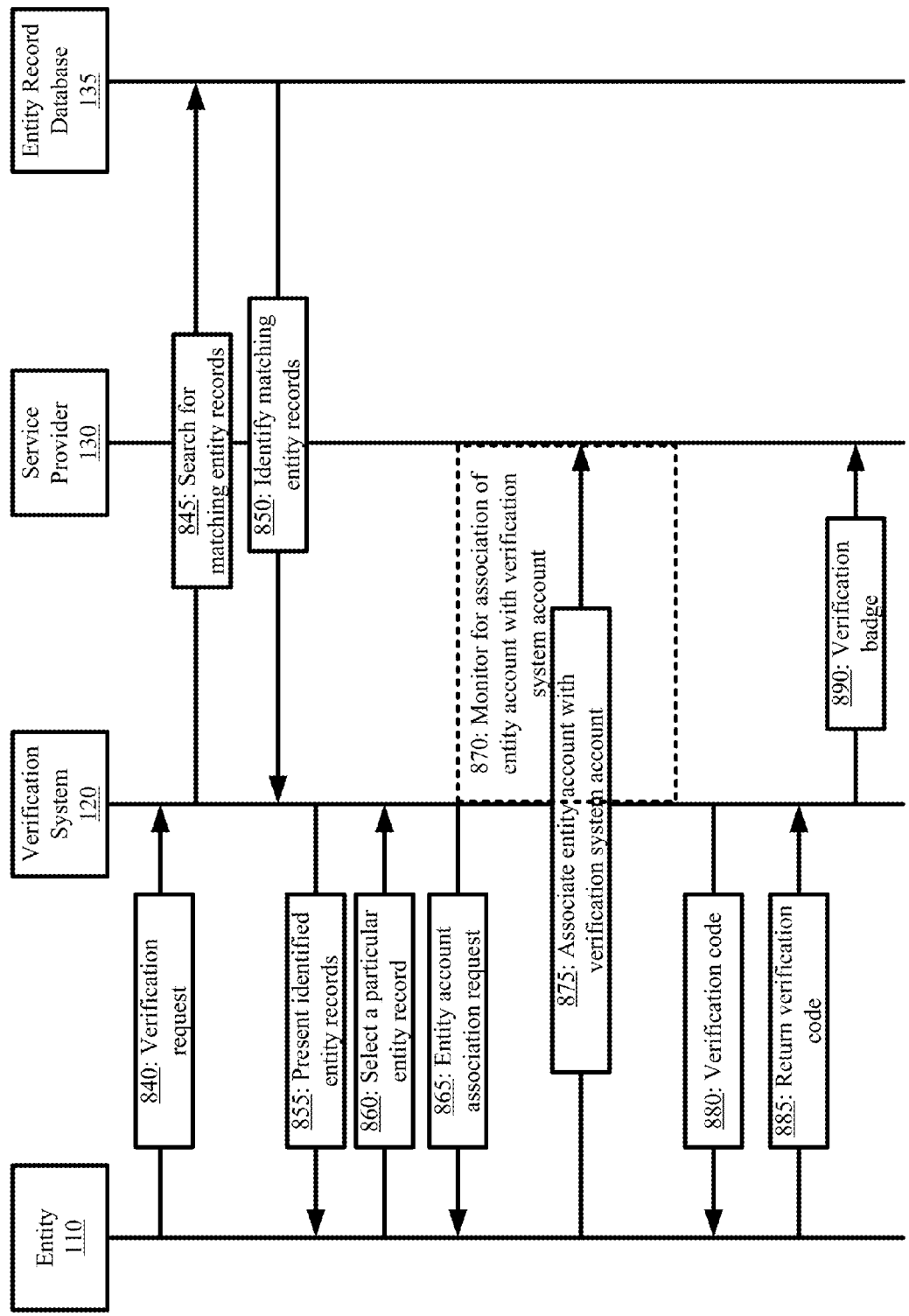
FIG. 8 conceptually illustrates the verification system performing a modified automatic entity verification method that is in accordance with some embodiments.

In addition to or instead of the verification method described above with reference to FIG. 1, the verification system 120 can be adapted to automatically verify entities using alternative verification methods or processes. FIG. 8 conceptually illustrates the verification system performing a modified automatic entity verification method that is in accordance with some embodiments. As with FIG. 1, FIG. 8 includes entity 110, verification system 120, service provider 130, and entity record database 135. However, FIG. 8 presents a modified two part verification campaign that is performed by the verification system 120. Specifically, the account ownership authentication part of the verification campaign is performed by account association rather than sending of a message with a first verification code to an entity account of the entity 110.

Steps 840-860 of FIG. 8 are similar or the same to steps 140-160 of FIG. 1 for receiving a verification request, searching the entity record database 135 based on entity account information in the verification request to identify matching entity records, and presenting the identified entity records to the entity 110 for selection of a particular entity record. However to perform the account ownership authentication for the verification campaign, the verification system 120 requests (at 865) that the entity 110 associate the account that it has registered at the service provider 130 with an account that the verification system 120 has registered at the service provider 130. The association request may be presented within a GUI of the verification system 120. For example, in a GUI that is presented after the GUI for selecting an entity record (i.e., GUI 310 of FIG. 3). Alternatively, the association request may be presented by sending a message to the entity account of the entity 110 when the entity account username, handle, or other identifier is obtained from the verification request or otherwise. In some embodiments, associating an entity account with an account of the verification system 120 includes linking the accounts together or otherwise establishing a relationship or connection between the two accounts. To associate an account on Twitter, the entity 110 logs in to its Twitter account and from that account "follows" a Twitter account that the verification system 120 has registered on Twitter. To associate an account on Facebook, the entity 110 logs in to its Facebook account and from that account sends a "friend" request to a Facebook account that the verification system 120 has registered on Facebook. It should be apparent that other forms of account association are supported for these and other service providers such as Google+, LinkedIn, MySpace, etc.

During an interval after presenting the association request at 865, the verification system 120 monitors (at 870) for the association to be completed. For example to complete account association on Twitter, the verification system 120 monitors its Twitter account ("@DandB_Verify") to determine if the entity 110 has added its Twitter account as a "follower" of the verification system 120 Twitter account within the monitoring interval. In some embodiments, the verification system 120 knows which entity account associations to monitor for during the monitoring interval as the handle, username, or other identifier for the account of the entity 110 was provided as part of the verification request at 140. When the handle, username, or other identifier is not present in the verification request, the verification system 120 may present a GUI that requests the entity 110 to first identify its account before the association request is sent at 865. Other means with which the verification system 120 knows which entity account associations to monitor for during the monitoring interval include (1) monitoring for any associated handles, usernames, or other identifiers that bear some resemblance or that match to the entity's name (obtained from the entity record) by some threshold degree (e.g., at least 50% accuracy) or (2) performing verification of a single entity at any given instance in time such that there are no conflicting associations during the monitoring interval.

Figure 9:
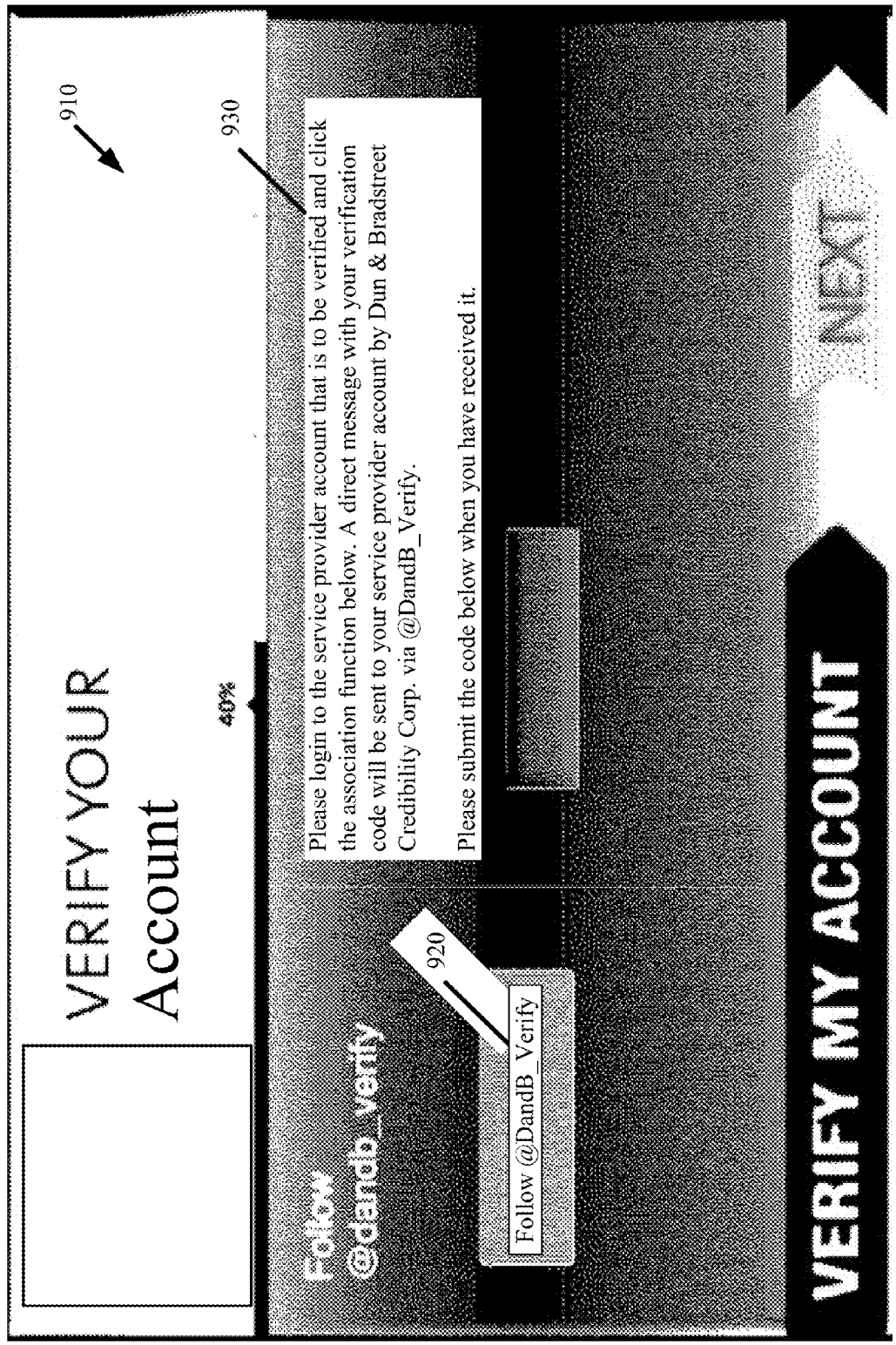
FIG. 9 illustrates an exemplary GUI for presenting the association request with the association function in accordance with some embodiments.

In some embodiments, the verification system 120 simplifies the account association step by providing an association function directly in the association request presented at 865. Provided that the entity 110 is already logged in to the account from which the association is to occur, the entity 110 invokes the association function (e.g., by clicking a button) to complete the association. The association function then performs the association of the entity account with the account of the verification system 120. FIG. 9 illustrates an exemplary GUI 910 for presenting the association request with the association function in accordance with some embodiments. The GUI 910 includes an association function 920 and instructions 930 for performing the entity account association using the association function 920. In this figure, the service provider 130 is Twitter and the entity 110 is attempting to verify its Twitter account. To perform the association, the entity 110 is requested to associate its Twitter account with a Twitter account of the verification system 120 (i.e., "@DandB-_Verify") by "following" the verification system 120 Twitter account. To do so, the entity 110 can login to whatever Twitter account it wants to verify and the entity 110 then invokes the association function to automatically cause the logged in account to follow the Twitter account of the verification system 120. As should be apparent to one of ordinary skill in the art, different GUIs with different association functions will be presented for associating accounts that are registered on different service providers.

With reference back to FIG. 8, when the entity account association occurs within the monitoring interval, the verification system 120 verifies that the entity 110 is the true owner of the entity account that is registered with the service provider 130 by virtue of the entity's 110 ability to access the account and perform the requested association. When the association does not occur within the monitoring interval, the entity 110 is either not the true owner of the entity account that is registered with the service provider 130 or the entity 110 did not perform the association in time in which case the entity 110 will have to repeat the association procedure. In this figure, it is assumed that the entity 110 performs (at 875) the requested association within the monitoring interval to complete the first part of the verification campaign. The second part of the verification campaign (i.e., entity authentication) presented at steps 880-890 are similar or the same to the second part of the verification campaign as described with reference to steps 180-190 of FIG. 1.

The verification system 120 may perform either or both of the account ownership authentication methods presented in FIGS. 1 and 8 depending on which method is optimal or preferred by different service providers. In some embodiments, the verification system 120 performs the entity account association of FIG. 8 prior to the passing of the message with the first verification code for service providers that do not allow the message with the first verification code to be sent unless an existing association exists between the account of the entity and the account of the verification system. For example, Twitter prevents the verification system from sending a direct message with the first verification code to an account of an unverified entity unless an association exists between the entity and the verification system, wherein the association may be established by having the account of the entity "follow" the account of the verification system. Both account ownership authentication methods of FIGS. 1 and 8 may also be performed for service providers that prefer a more extensive or secure verification process.

Figure 10:
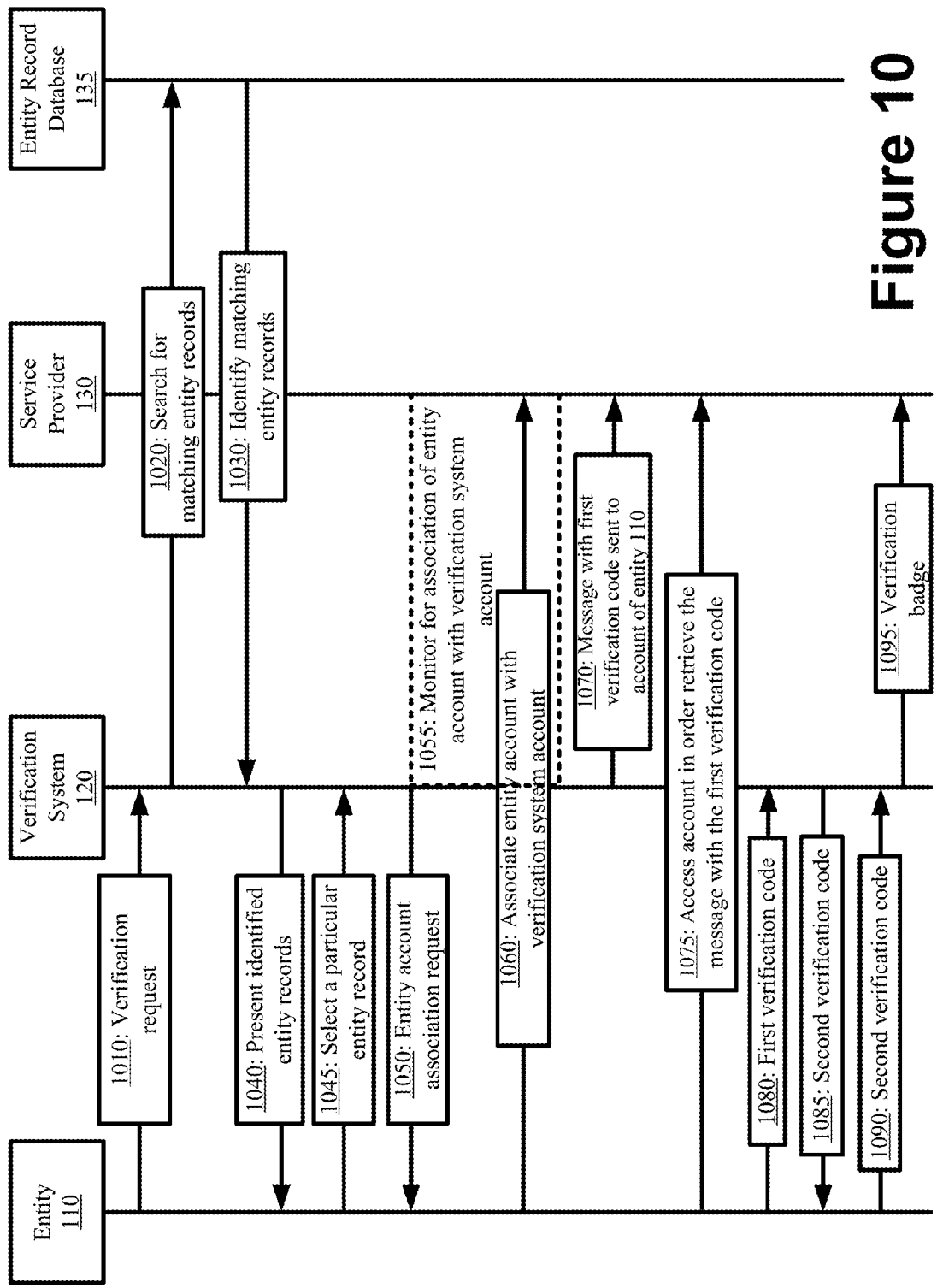
FIG. 10 presents a modified account ownership authentication method that performs each of the account ownership authentication methods of FIGS. 1 and 8 in accordance with some embodiments.

FIG. 10 presents a modified account ownership authentication method that performs each of the account ownership authentication methods of FIGS. 1 and 8 in accordance with some embodiments. In this figure, the account ownership authentication part of the verification campaign requests (at 1050) that the entity 110 associate an account that it has registered at the service provider 130 with an account that the verification system 120 has registered at the service provider 130. The verification system 120 then monitors (at 1055) for the association and once the association is complete (at 1060), the verification system 120 passes (at 1070) the first verification code in a message to the associated account of the entity 110 at the service provider 130. The entity 110 then accesses (at 1075) its account at the service provider 130 in order retrieve the message with the first verification code. Upon accessing the message, the entity 110 extracts the first verification code from the message and provides (at 1080) the first verification code back to the verification system 120 in a specified manner to complete the account ownership authentication part of the verification campaign. The second part of the verification campaign, entity authentication, illustrated at steps 1085-1090 is as described with reference to FIGS. 1 and 8 above.

Figure 11:
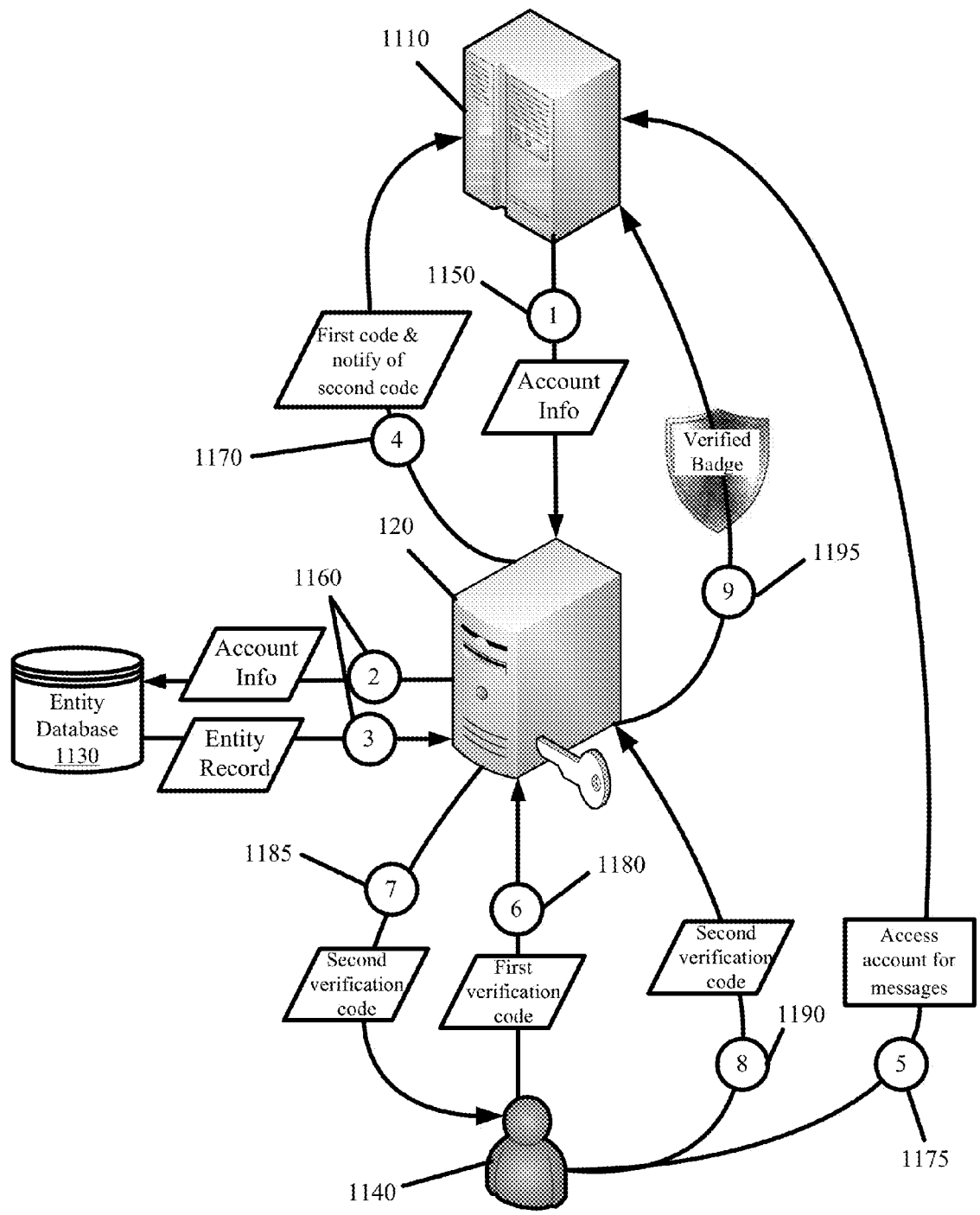
FIG. 11 presents the verification system performing the verification campaign as a result of the service provider initiating the verification process.

FIG. 11 presents the verification system performing the verification campaign as a result of the service provider initiating the verification process. FIG. 11 depicts service provider 1110, verification system 120, entity record database 1130, and entity 1140. The verification system 120 is communicably coupled to the service provider 1110 and entity record database 1130 in order to remotely access the databases of the service provider 1110 and the entity record database 1130.

The automated entity verification method commences when the service provider 1110 provides (at 1150) to the verification system 120 entity account information for one or more unverified entities that are registered with the service provider 1110. The entity account information can be pushed from the service provider 1110 to the verification system 120. In this manner, the service provider 1110 can selectively push entity account information for a subset of unverified accounts/entities to the verification system 120. For example, the service provider 1110 may identify certain high profile accounts for entities that it wants to be verified because of the exposure received by those entities. As another example, the service provider 1110 may require certain accounts to be verified while other accounts can remain unverified. For example, the service provider 1110 may require accounts registered by business entities to be verified, while accounts registered by individuals need not be verified. Additionally or alternatively, the verification system 120 can pull the entity account information from the service provider 1110. A wired or wireless data network (e.g., the Internet) communicably couples the verification system 120 to the service provider 1110 and the data network facilitates the transfer of the entity account information from the service provider 1110 to the verification system 120. The entity account information received by the verification system 120 includes all or a subset of the entity account information that an entity provides to the service provider 1110 when registering an account with the service provider 1110 (e.g., handle or username, individual or business name, address, email address, etc.). Such entity account information ordinarily does not include sufficient information from which to verify an entity. This is because the obtained information does not include confidential information such as a credit card number, social security number, DUNS® number, etc. that would uniquely identify the entity and that has been verified by some other third party as belonging to a particular entity. Moreover, information provided for the account registration may be falsified or incompletely specified in order to retain the anonymity of the entity. For the discussion of FIG. 11 that is to follow, it is assumed that the service provider 1110 provides entity account information for a single unverified entity to the verification system 120.

At 1160, the verification system 120 uses the received account information to identify an entity record from the entity record database 1130. The entity record is identified when information from the received entity account information matches with information contained within the entity record by the specified threshold. In this method of automated entity verification, the entity record matching may be performed to a higher degree of accuracy because this method is preferably performed without the entity 1140 accessing a GUI to select a particular entity record from a set of entity records that match to the specified threshold.

Once a matching entity record is identified, the verification system 120 extracts contact information from the obtained entity record to perform the two part verification campaign. In this figure, the verification campaign is performed according to the methods of FIG. 1. Specifically, the verification system 120 generates a first verification code and sends (at 1170) a message with the first verification code to the account that the entity 1140 has registered with the service provider 1110. The account username, handle, or other identifier is obtained from the entity account information that the service provider 1110 provides to the verification system 120 to commence the automated verification process. The message notifies the entity 1140 that it is to return the first verification code to the verification system 1120. The message further notifies the entity 1140 that upon returning the first verification code, a second verification code will be sent to the entity 1140 using a method of contact that is obtained from the matching entity record.

At some subsequent time, the entity 1140 accesses (at 1175) its account at the service provider 1110 and receives the message sent by verification system 120. If the message contains correct contact information for contacting the entity 1140 with the second verification code, the entity 1140 returns (at 1180) the first verification code to the verification system 120 in order to commence the second part of the verification campaign. Alternatively, the entity 1140 can identify that the verification system 120 has matched an incorrect entity record to the entity 1140 based on the method of contact specified in the message. The entity 1140 can then invoke a link in the message or perform other instructions to cause the verification system 120 to obtain a different entity record from which to extract a different method of contacting the entity 1140 with the second verification code.

Once the first verification code is returned at 1180, the verification system 120 communicates (at 1185) the second verification code to the entity 1140 using a method of contact that is obtained from an entity record that is matched to the entity 1140. The entity 1140 returns (at 1190) the second verification code to the verification system 120 such that the entity account is verified for the entity 1140 and the verified status of the entity 1140 is communicated (at 1195) to the service provider 1110 such that a verification badge or other indication is presented with the entity account.

Figure 12:
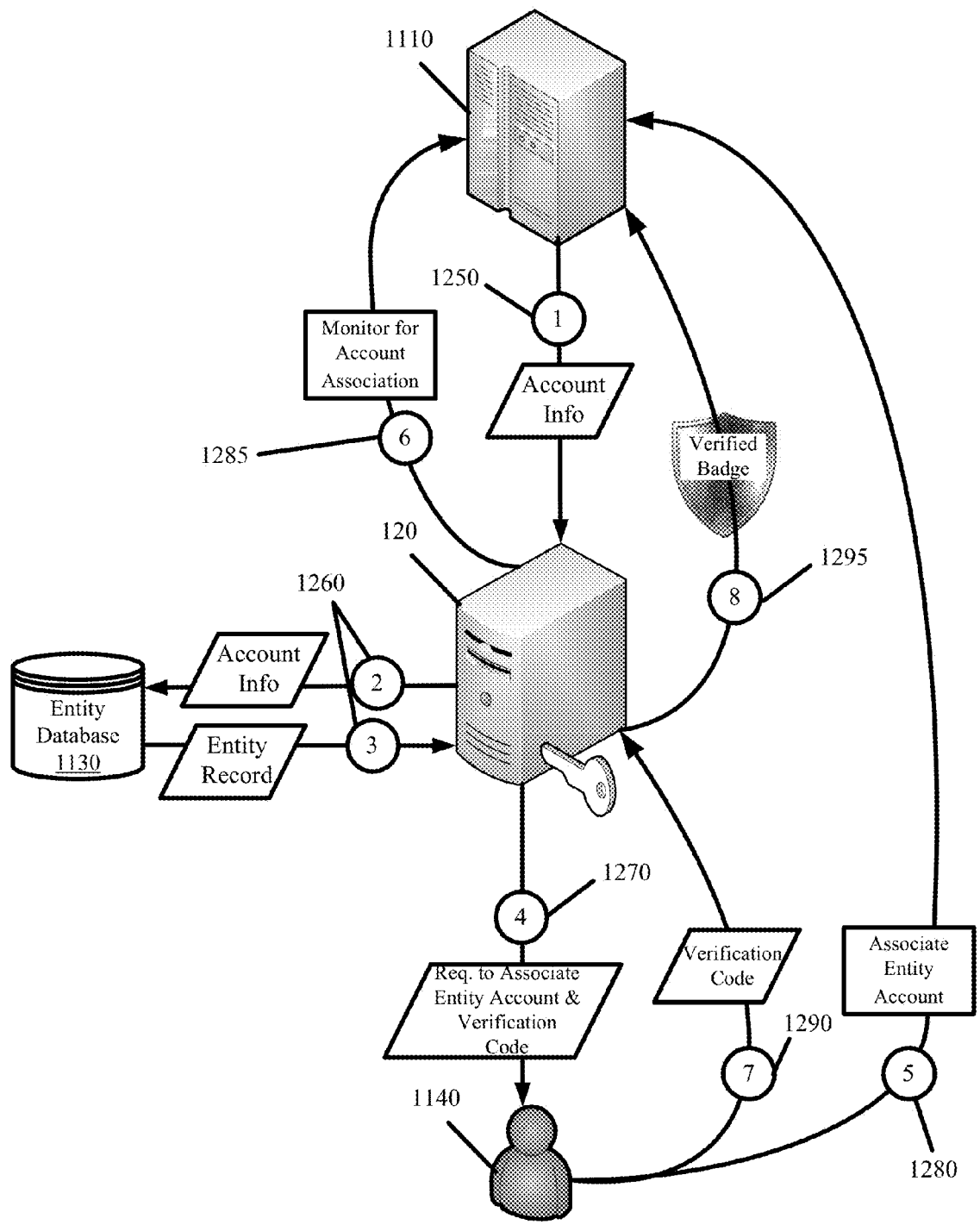
FIG. 12 presents the verification system performing an alternate verification campaign as a result of the service provider initiating the verification process.

FIG. 12 presents the verification system performing an alternate verification campaign as a result of the service provider initiating the verification process. This verification performed in this figure is similar to that presented above with reference to FIG. 11 except that the verification campaign is performed according to the methods of FIG. 8. Specifically, after obtaining (at 1250) entity account information from the service provider 1110 and identifying (at 1260) an entity record from the entity record database that matches to the entity account information by the specified threshold, the verification system 120 performs the verification campaign by generating a verification code and sending (at 1270) the verification code in a communication to the entity 1140 using one of the methods of contact present in the matched entity record. The communication includes instructions for the entity 1140 to complete the verification campaign. Instructions for performing the first part of the verification include instructing the entity 1140 to associate an account that it has registered at the service provider 1110 with an account that the verification system 120 has registered with the service provider 1110. In some embodiments, the verification system 120 knows the entity account of the entity 1140 to look for during association, because the account handle or username is provided by the service provider 1110 to the verification system 120 as part of the entity account information submitted at step 1150. Accordingly, when the entity 1140 performs (at 1280) the association, the entity 1140 verifies that it has access to the account being verified at the service provider 1110. The verification system 120 confirms that the association has occurred by monitoring (at 1285) its account at the service provider 1110 to look for a new association from an account of the entity 1140. Upon confirmation of the association, the first part of the verification campaign is complete.

Instructions for performing the second part of the verification include instructing the entity 1140 receiving the communication at 1170 to return the verification code back to the verification system 120. When the entity 1140 responds (at 1190) by providing the verification code back to the verification system 120, the second part of the verification is complete and the entity 1140 is verified. The verification system 120 notifies (at 1195) the service provider 1110 of the verification.

Figure 13:
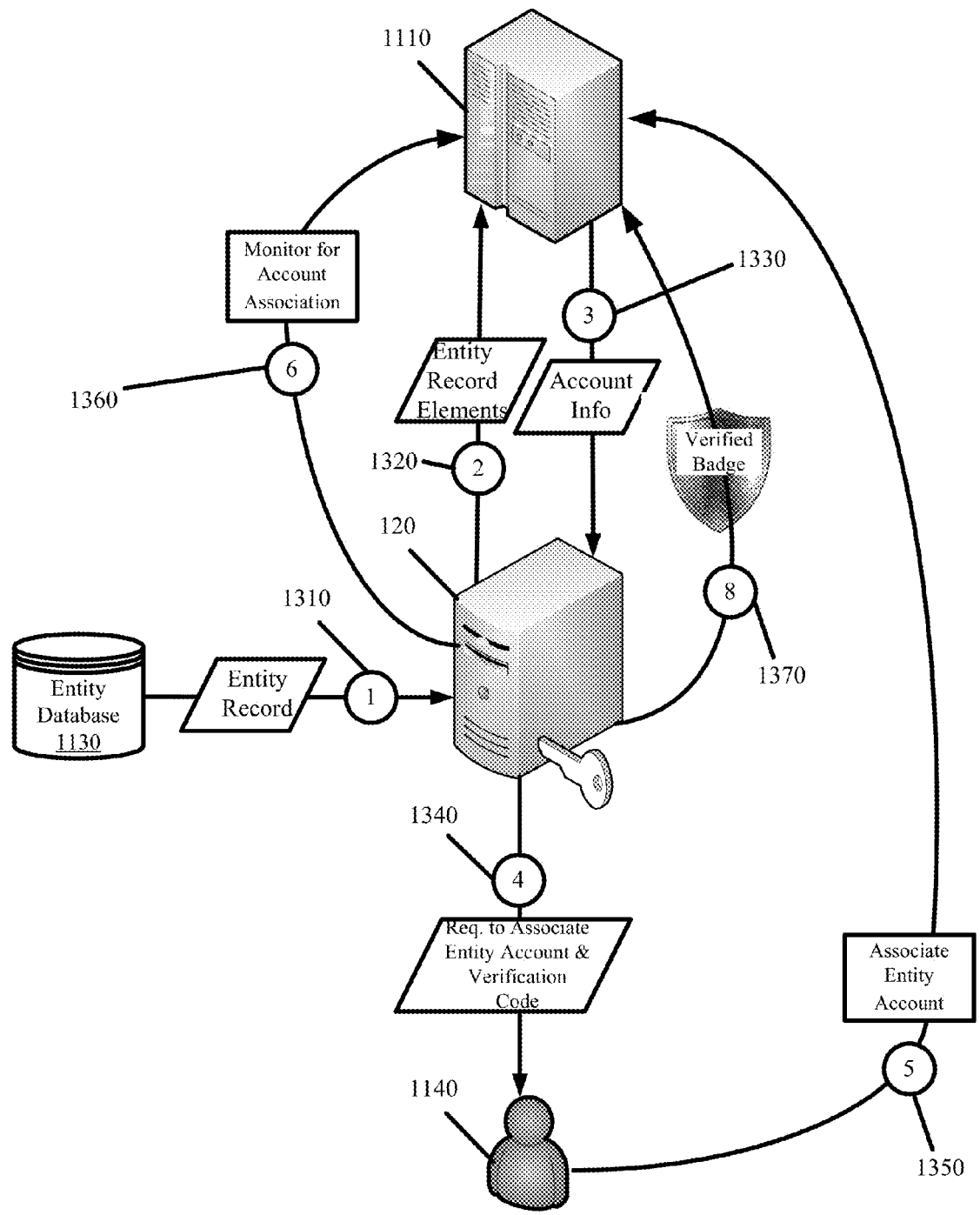
FIG. 13 conceptually illustrates the verification system performing a reverse verification method in accordance with some embodiments.

FIG. 13 conceptually illustrates the verification system performing a reverse verification method in accordance with some embodiments. The automatic verification method of FIG. 13 may be performed in addition to or instead of those automatic verification methods that are described above with reference to FIGS. 1, 8, 11, and 12. The verification method of FIG. 13 involves the same components as the verification method of FIG. 11, namely the service provider 1110, verification system 120, entity record database 1130, and entity 1140. As earlier noted, multiple service providers, entity record databases, and entities may simultaneously be communicably coupled to and interact with the verification system 120.

To perform the reverse verification method, the verification system 120 first obtains (at 1310) an entity record from the entity record database 1130. The verification system 120 then attempts (at 1320) to identify different entity accounts for verification by matching the verified information from the entity record to entity account information of the service provider 1110 to identify unverified entity accounts that may be related to the entity record. The identified entity accounts matching to the elements of the entity record to a sufficient degree are returned (at 1330) to the verification system 120. For example, the entity record obtained at 1310 includes the business name "Acme Pizza" and matching the business name with the entity accounts at the service provider 1110 identifies entity accounts "@AcmePizzaCo", "@AcmePizzaPie", and "@AcmeInc".

The verification system 120 extracts contact information from the entity record and performs a modified verification campaign using the extracted contact information. In this figure, the entity record contains information pertaining to the entity 1140 and the extracted contact information is therefore used to contact entity 1140. The verification system 120 submits (at 1340) a communication that includes the identified entity accounts (e.g., @AcmePizzaCo, @AcmePizzaPie, and @AcmeInc.) and instructions for performing the verification to the entity 1140 within a particular time interval. The entity 1140 can then verify whichever identified accounts belong to it. For example, it may be that the entity 1140 has registered entity account "@AcmePizzaCo" with the service provider 1110, but has not registered entity accounts "@AcmePizzaPie", and "@AcmeInc". To verify the entity account "@AcmePizzaCo", the entity 1140 associates (at 1350) its "@AcmePizzaCo" entity account with an account that the verification system 120 has registered with the service provider 1110 before expiration of the particular time interval. The verification system 120 monitors (at 1360) for the association within the particular time interval after sending the communication at 1340. The entity 1140 will only be able to associate the identified entity accounts that it has access to and that belong to it, but not other identified entity accounts. In this manner, the entity 1140 cannot improperly verify entity accounts of other entities. Alternatively, the verification system 120 could provide a verification code to the entity 1140 in the communication at 1340 and the entity 1140 can return the verification code with a message originated from the account that the entity 1140 has registered at the service provider 1110. Upon performing the association or returning the verification code, the verification system 120 notifies (at 1370) the service provider 1110 of the verified status of the entity account and a verification badge may then be displayed next to the verified account. It should be apparent that the second part of the verification campaign may be omitted in the method of FIG. 13 since only the entity 1140 receiving the communication at 1340 from the verification system 120 will know the time interval in which it may associate its entity account for verification or the verification code to send from its entity account.

Figure 14:
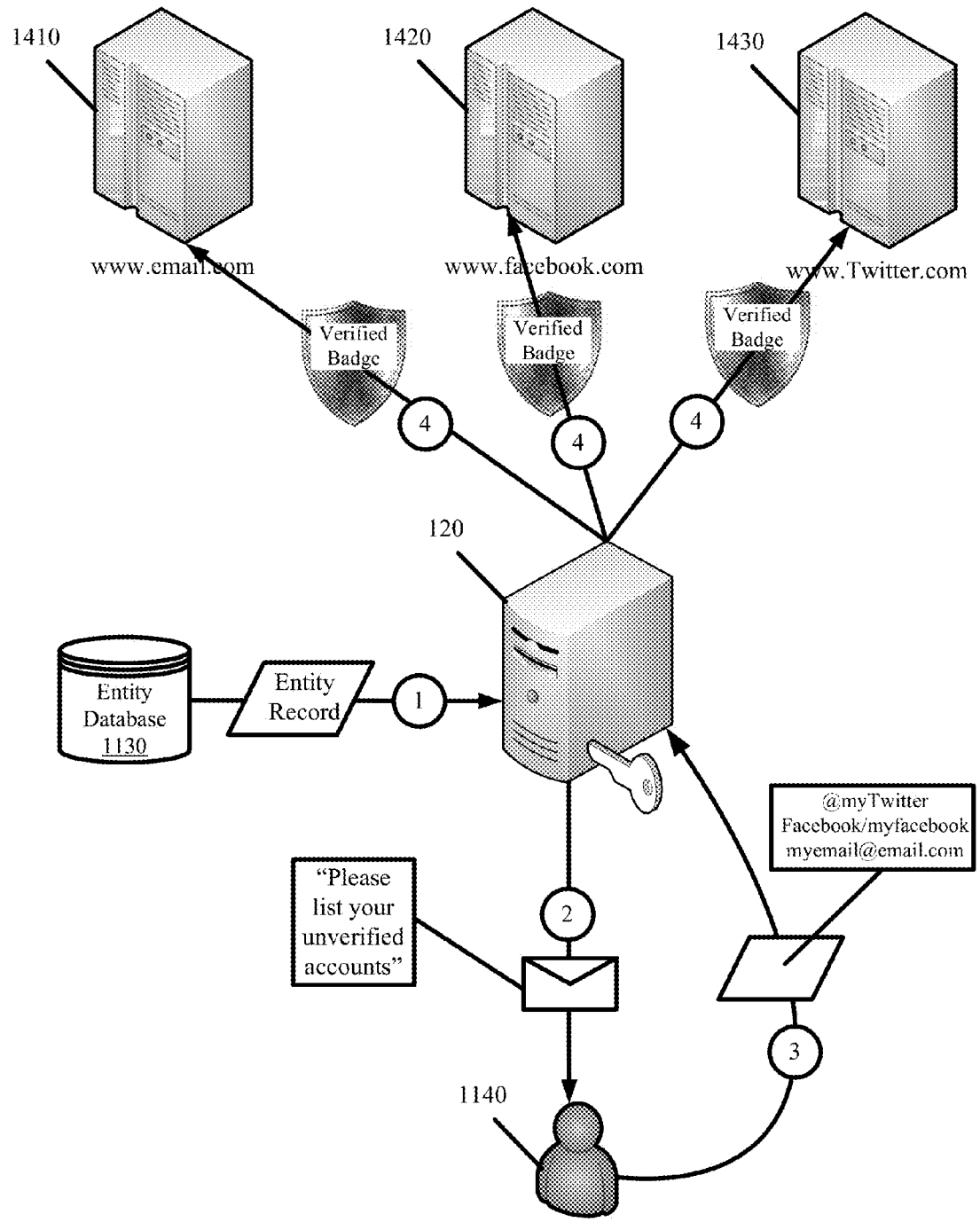
FIG. 14 conceptually illustrates the verification system performing a multi-account verification method that is in accordance with some embodiments.

FIG. 14 conceptually illustrates the verification system performing a multi-account verification method that is in accordance with some embodiments. The multi-account automatic verification process of FIG. 14 may be performed in addition to or instead of the automatic verification methods and processes described above. As shown the verification method of FIG. 14 involves service providers 1410, 1420, and 1430, verification system 120, entity record database 1130, and entity 1140.

In this figure, the verification system 120 performs entity verification independent of service provider provided entity account information. To perform verification in this manner, the verification system 120 directly obtains a set of entity records from the entity record database 1130. The verification system 120 extracts contact information from the obtained set of entity records and the contact information is then used by the verification system 120 to perform a verification campaign that requests the receiving entity 1140 to manually specify accounts that belong to it. This may include disseminating an email as part of the verification campaign that includes a link which when invoked directs the receiving entity 1140 to a website of the verification system 120 in which the receiving entity 1140 can specify accounts that it wishes to have verified and optionally the service providers that the accounts are registered with. Alternatively, the receiving entity 1140 can reply to the email, enter unverified accounts that the entity 1140 wishes to be verified, and optionally enter the service providers that the accounts are registered with. In some embodiments, the verification campaign may include disseminating an audible message that may be interrupted with a key tone to connect the receiving entity 1140 with a live representative of the verification system 120 that then collects the entity accounts or, if no key tone is provided, the audible message identifies a telephone number that the receiving entity 1140 can dial to speak to a live representative in order to collect the entity accounts of the receiving entity 1140. It should be apparent that other means can also be used to collect the account information (e.g., text messages). Once the account information is collected, the verification system 120 may then send (not shown) a verification code to the identified accounts at the service providers 1410, 1420, and 1430 and require that the entity 1140 return the verification codes to the verification system 120 in order to ensure that the entity 1140 has control over the accounts. Alternatively, the verification system 120 may require (not shown) the entity to associate each of the identified accounts at the service providers 1410, 1420, and 1430 with an account that the verification system 120 has registered at the corresponding service provider in order to ensure that the entity 1140 has control over the identified accounts. Upon verification, the verification system 120 interfaces with the appropriate service providers 1410, 1420, and 1430 to notify them of the accounts that the entity 1140 has verified. The service providers 1410, 1420, and 1430 can then act upon the verified accounts in any preferred manner including the above described placement of the verification badge next to the account handle.

In some embodiments, the verification system automatedly verifies businesses with an offline presence. This may include verifying a business storefront by verifying that the business has accurately represented itself to business registration databases including, for example, the secretary of state. In some such embodiments, the offline business submits a verification request to the verification system. The request may be submitted via a physical mailing, telephone call-in, or by the verification system automatically retrieving an entity record for the business. The verification campaign is performed by sending a physical mailing with a verification code to the business at the address contained within the entity record for the business. Should the business return the verification code back to the verification system, the verification system can send a physical verification badge (i.e., signage) to the business for placement on its storefront.

As earlier noted, the verification system can be a service that is performed independent of any single service provider and more importantly, the verification system can perform entity verification for several service providers as well as providing other verification services in addition to entity verification. In so doing, the verification system can provide value added functionality that extends beyond entity verification. Some such value added functionality is described below.

II. Supplemental Verification

In some embodiments, the verification system supplements the verification status of a particular entity by providing for different levels of verification and by performing comprehensive verification of the particular entity. In some embodiments, the different levels of verification are determined by verifying the particular entity using one or more of the above described verification methods and supplementing that verification with corroborating information that is acquired from supplemental sources. In some embodiments, the comprehensive entity verification includes verifying additional informational aspects of the particular entity in addition to the verification that is performed using one or more of the above described verification methods.

One supplemental source with which to supplement the verification status of an entity includes the website of the particular entity. Typically, the website lists information about the particular entity that should corroborate with information in the entity record databases and also with information that the particular entity used to register an account at a service provider. For example, the telephone number, mailing address, and email address appearing on an entity's website should corroborate with the telephone number, mailing address, or email address that the particular entity provides to a service provider or that is obtained from an entity record of the entity record database. The website may also specify entity accounts that the entity has with various service providers and that are also the subject of the verification methods of Section I above. For example, the verification system verifies the Twitter account "@MyBusiness" for a particular entity using one of the methods in Section I above. The verification system can then further verify that Twitter account by identifying mention of that Twitter account some-where on the entity's website. For example, a website entry stating "Follow us on Twitter @MyBusiness". Other supplemental sources that the verification system can use to supplement the verification status of a particular entity include information directories (e.g., yellowbook.com), domain registrars, credit bureaus, etc.

The more information the verification system can corroborate with supplemental sources, the more trustworthy and credible the entity becomes. This ensures that the entity is not representing itself one way at one service provider and a different way at another service provider. Commonality across different informational sources ensures consistency thereby leading to greater trustworthiness and a greater level of entity verification. In some embodiments, an unverified status may be assigned to an entity that cannot complete any of the verification campaigns described in Section I above. A first verified status may be assigned to an entity that completes one of the verification campaigns, but for which no other supplemental information exists for additional verification. A second verified status may be assigned to an entity that completes one of the above described verification campaigns and the verification system can further verify that entity based on corroborated information that is available at a supplemental source such as the entity website.

Figure 15:
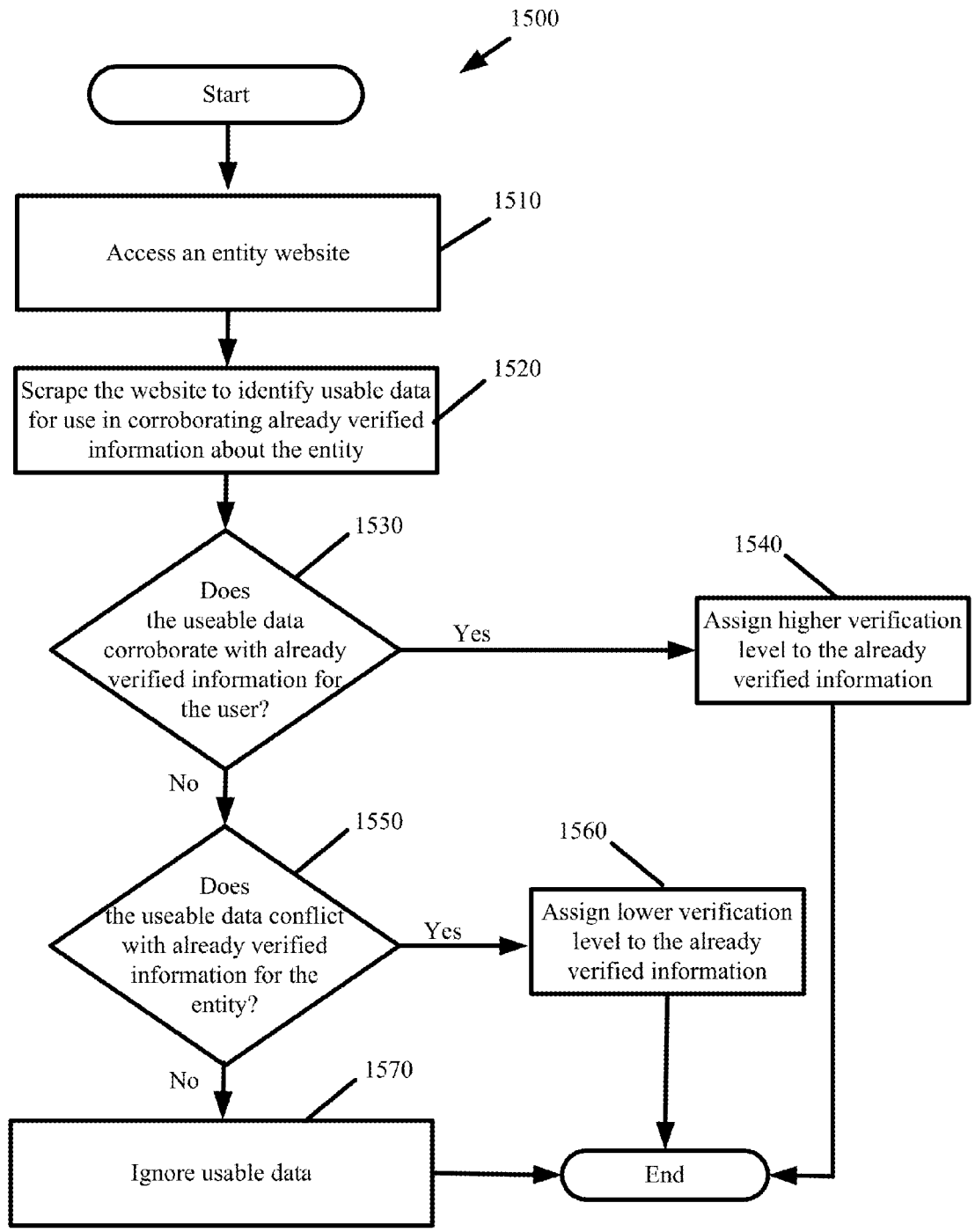
FIG. 15 presents a process performed by the verification system to perform supplemental verification of an entity using information appearing on the entity's website.

FIG. 15 presents a process 1500 performed by the verification system to perform supplemental verification of an entity using information appearing on the entity's website. The process 1500 commences by accessing (at 1510) the website of an entity. The entity's website can be obtained from an entity record or by Internet searching for the name of the entity. Next, the process scrapes (at 1520) the website to identify usable data for use in corroborating already verified information about the entity. Usable data includes telephone numbers, mailing addresses, email addresses, names, account handles, usernames, etc.

The process determines (at 1530) whether the useable data corroborates with already verified information for the entity. If so, the verified information corroborating with the useable data is assigned (at 1540) a higher verification level. An example of this includes scraping an email address from the website that is also an email address that the entity used to register an account at a service provider or that is an email address that is within an entity record obtained from an entity record database. The process determines (at 1550) whether the useable data conflicts with already verified information for the entity. If so, the verified information that conflicts with the useable data is assigned (at 1560) a lower verification level. An example of this includes scraping a Twitter account handle "@AcmeInc" from the website that conflicts with the Twitter account handle "@AcmeCo" that the verification system earlier verified for the entity using one of the methods in Section I above. Other useable data scraped from the website that cannot be corroborated or does not conflict with already verified information, can be ignored (at 1570) or added to an entity record. For the purposes of simplicity it was assumed that a single item of useable data is scraped from the website in process 1500. However, if multiple useable data is scraped, then steps 1530-1560 are repeated for each item of useable data.

The different verification levels may be indicated with different verification badges. The verification badge may be placed next to the item of information appearing on the entity website and on the service provider site from which it was initially obtained. In some embodiments, the verification system provides a verification page from which the verification status and different verified aspects of a particular entity can be determined. One such verification page is presented below with reference to FIG. 18.

Figure 16:
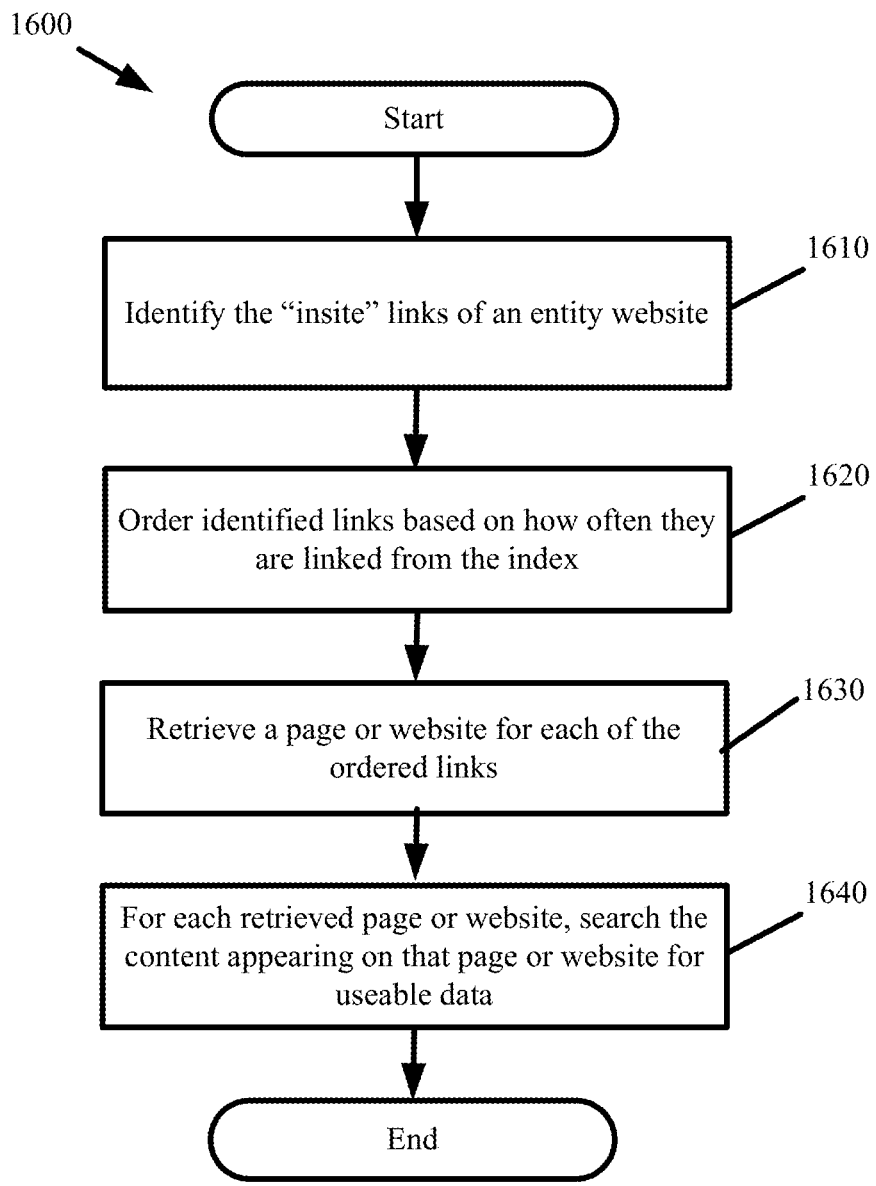
FIG. 16 presents a process for performing the entity website scraping in accordance with some embodiments.

FIG. 16 presents a process 1600 for performing the entity website scraping in accordance with some embodiments. In some embodiments, the process 1600 is performed when the verification system or a script run by the verification system is directed to the entity's website via an HTML request. The process begins by identifying (at 1610) the "insite" links of the website. Insite links are links to the same domain or subdomain. For example, the links to www.example.com/page1.htm, www.example.com/images/pic1.jpg, and files.example.com/video1.flv are all within the same domain or subdomain. To find the insite links, the process may search the domain's index (e.g., www.example.com/index.html). The process orders (at 1620) the identified links based on how often they are linked from the index. In some embodiments, the process truncates the list of identified links to a reduced subset as part of the ordering. Next, the process retrieves (at 1630) a page or website for each of the ordered links. For each retrieved page or website, the process searches (at 1640) the content appearing on that page or website for the useable data. The useable data includes specially formatted information such as telephone numbers, email addresses, mailing addresses, outside links to service providers, outside links to other verification services (e.g., TrustE®, McAfee®, Better Business Bureau), and entity account handles or username. The useable data is then used to corroborate verified information for the entity as per the process 1500 above or some other process.

Figure 17:
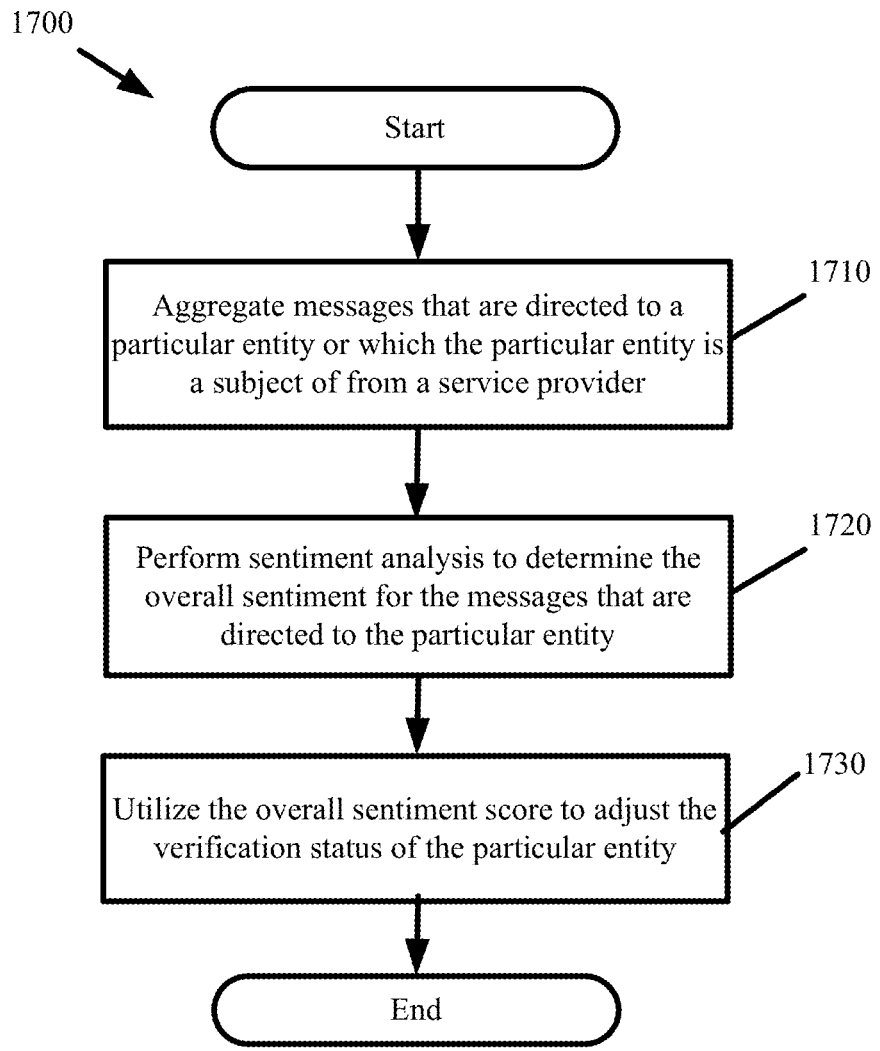
FIG. 17 presents a process performed by the verification system to supplement the verification status of a particular entity based on messages obtained about the particular entity from a service provider that is seeking to or has verified a status of the particular entity.

FIG. 17 presents a process 1700 performed by the verification system to supplement the verification status of a particular entity based on messages obtained about the particular entity from a service provider that is seeking to or has verified a status of the particular entity. The process 1700 begins by aggregating (at 1710) messages about the particular entity from the service provider. In some embodiments, the service provider is a social networking site such as Twitter, Facebook, Google+, or the like. In some embodiments, the messages aggregated about the particular entity includes social networking messages that are directed to the particular entity or which the particular entity is the subject of. The messages will ordinarily include messages that are publicly viewable at the service provider. For example, Twitter "tweets" and Facebook public wall posts are examples of such messages. Messages that are directed to the particular entity will ordinarily include the handle, username, or other identifier of the particular entity or will appear on a site that the service provider provides for the particular entity. The process may aggregate these messages through partnership agreements established with the service providers or by scraping the sites of the service providers to obtain the publicly viewable messages. Scraping a site includes accessing the site containing the publicly viewable messages and running an automated script to identify and extract the messages and identify particular messages of interest. The messages of interest include those messages that are directed to the particular entity or which the particular entity is the subject of.

Next, the process performs (at 1720) sentiment analysis for the aggregated messages that are directed to the particular entity. Sentiment analysis involves processing each of the aggregated messages to determine if the messages have a positive or negative connotation based on the words used in the message. Sentiment analysis may include computing a score to quantify the sentiment for each processed message. The scores for all obtained messages can be processed to compute an overall sentiment score for the particular entity at the service provider. A negative overall sentiment score would therefore represent a negative sentiment that is indicative of a majority of the messages having a negative connotation or negative sentiment expressed towards the particular entity. A positive overall sentiment score would therefore represent a positive sentiment that is indicative of a majority of the messages having a positive connotation or positive sentiment expressed towards the particular entity. In some embodiments, sentiment analysis is performed using the Alchemy API developed by Orchestr8®, Inc. or a similar sentiment analysis automated tool that is specifically developed for and integrated with the verification system of some embodiment.

The process then utilizes (at 1730) the overall sentiment score to adjust the verification status of the particular entity. In some such embodiments, the verification status for an account of the particular entity is shown with a check mark to indicate that the account has been verified and with different coloration to express the sentiment expressed by others towards that account. For example, an overall negative sentiment can be expressed with the color red and an overall positive sentiment can be expressed with the color green. This supplemented verification status not only tells others whether an entity is who it claims to be, but also whether that entity is credible and positively perceived. The entity can also leverage the sentiment of the verification status to determine if its business practices need to be changed in order to improve its credibility or perception.

In some embodiments, the verification system provides a verification page from which verification status for different online accounts and informational aspects of a particular entity can be determined. The verification page is accessible by directing a web browser to a specific URL of the verification system (e.g., www.verificationsystem.com/entityABC) or by searching for the verification status of a particular entity using a landing page of the verification system (e.g., www.verificationsystem.com). Additionally, the verification page for a particular entity can also be directly accessed in some embodiments by clicking on a verification badge that is displayed next to any account of the particular entity at any service provider that utilizes the services of the verification system. Once the verification badge is clicked, a hyperlink is invoked that directs the user to the verification page that displays the complete verification status for the particular entity.

Figure 18:
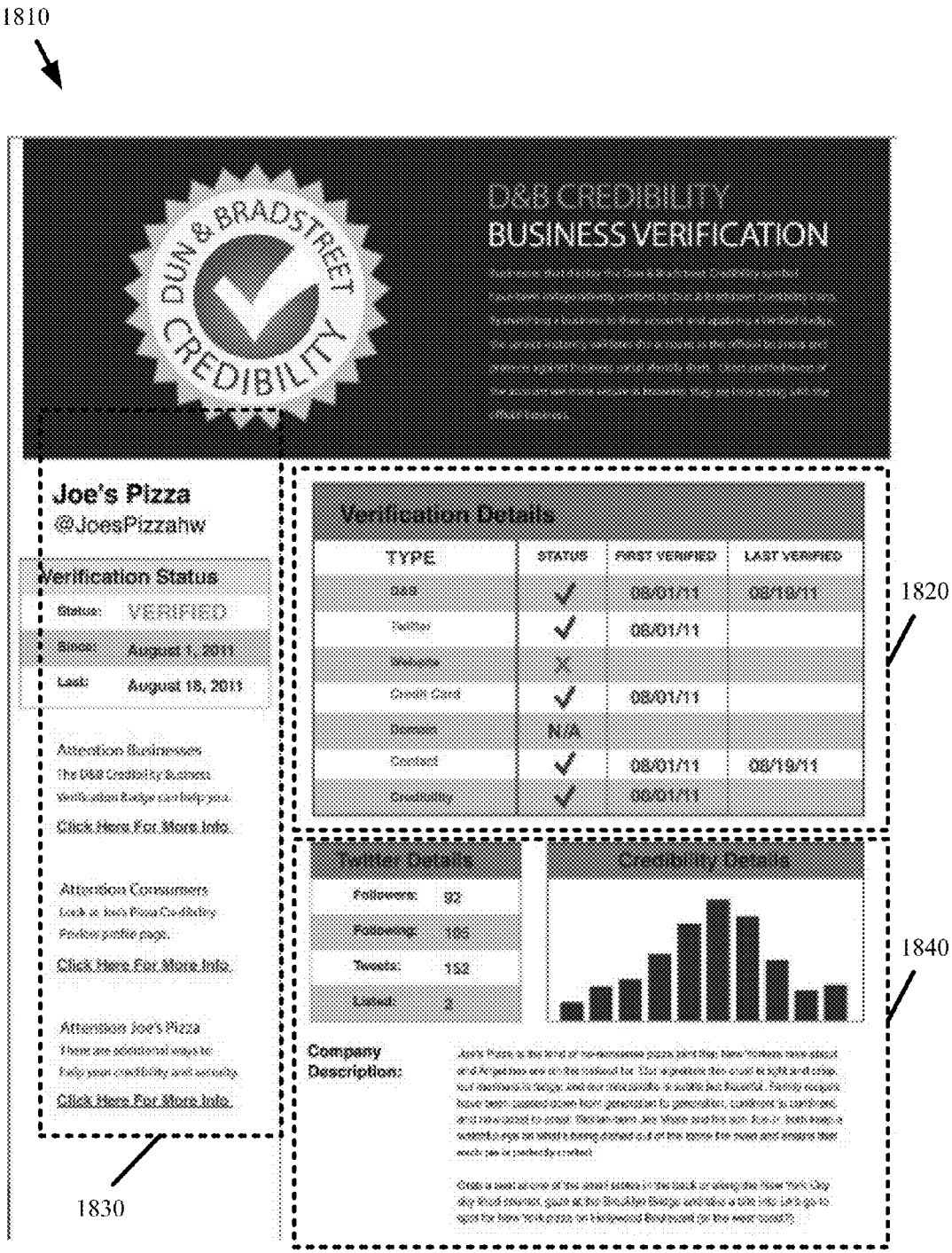
FIG. 18 illustrates a verification page in accordance with some embodiments.

FIG. 18 illustrates a verification page 1810 in accordance with some embodiments. As shown, the verification page 1810 is separated into three regions 1820, 1830, and 1840. Region 1820 presents the accounts for a particular entity that have been verified by the verification system. These accounts may include online service provider accounts such as Twitter, Facebook, Google+, LinkedIn, and the like. Additionally, region 1820 may present the verification status for other informational aspects of the particular entity such as the website, domain, credit cards, and credibility of the particular entity. Different verification levels may also be depicted in region 1820 to specify whether a verified account or informational aspect was verified using information from a supplemental source.

Region 1830 identifies the verification status for the particular entity and value added links. The value added links provide information on how the particular can utilize the verification badge and its verification status to obtain new clientele, increase exposure, and improve the customer experience. The value added links can also direct the viewer to other informational pages about the particular entity, such as credibility pages generated by Dun & Bradstreet Credibility Corporation that detail the credibility status of the particular entity. Furthermore, the value added links can provide information to the particular entity on how it can improve its credibility and security.

Region 1840 presents summarized information that the verification system obtains from its various partners or the service providers that it is integrated with. For example, when the verification system is integrated with the systems of Dun & Bradstreet Credibility Corporation, the verification page can display summarized credibility information about the entity as well as descriptive information about the particular entity.

III. Verification System

Figure 19:
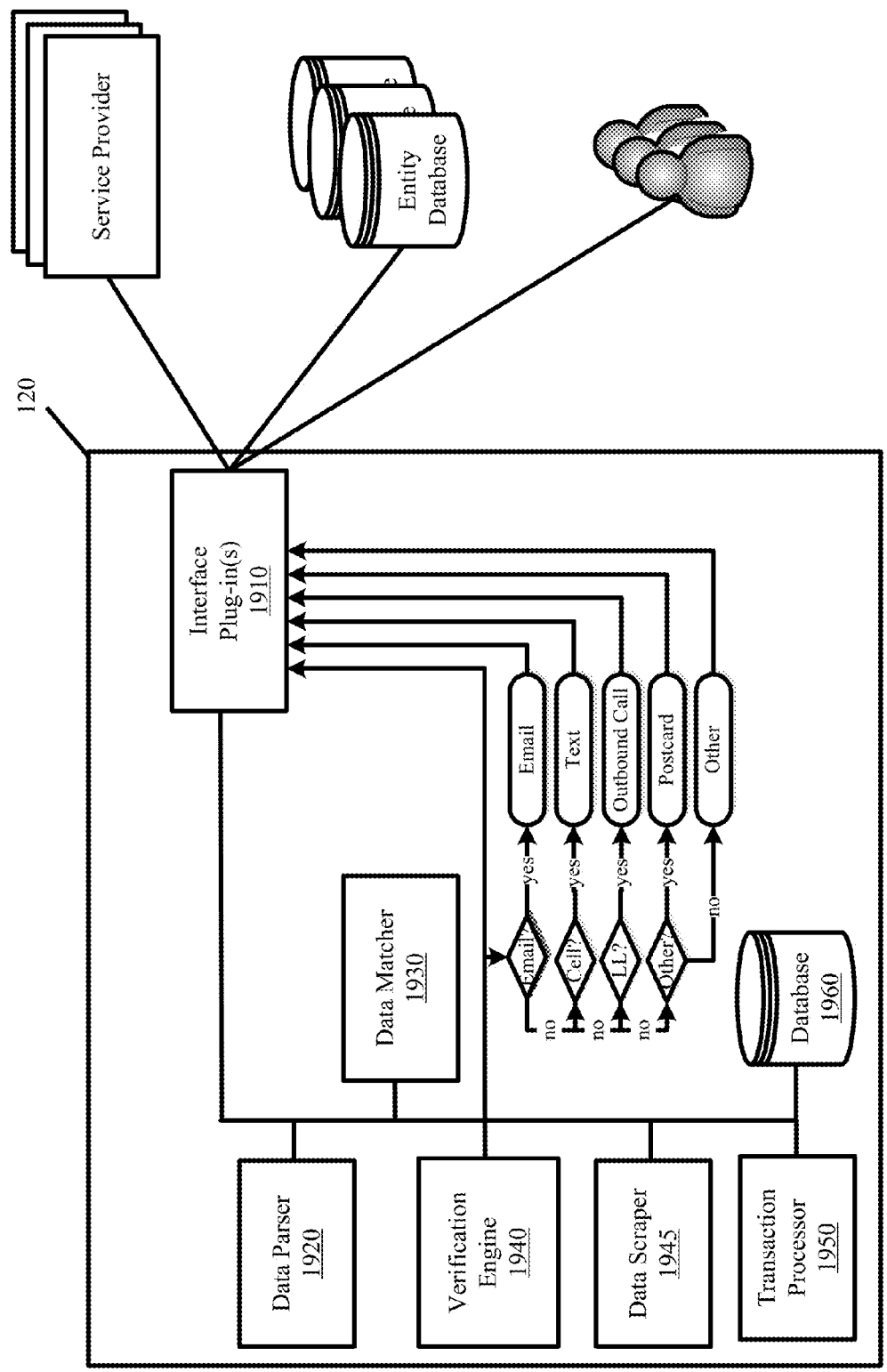
FIG. 19 illustrates components of the verification system for performing the various automatic entity verification methods and supplemental verification methods.

FIG. 19 illustrates components of the verification system 120 for performing the various automatic entity verification methods and supplemental verification methods described above. The verification system 120 includes an interface plug-in 1910, data parser 1920, data matcher 1930, verification engine 1940, data scraper 1945, transaction processor 1950, and database 1960.

Some or all of these components 1910-1960 are embodied as software applications or processes that execute on one or more physical computing devices. Collectively, the components 1910-1960 transform general purpose computing resources of the computing devices to implement and perform the specified automatic entity verification methods and supplemental verification methods described above in Sections I and II. In other words, the computing devices on which the verification system 120 executes comprise general purpose processors, random access memory, non-volatile storage, and network resources that are transformed by the components 1910-1960 of the verification system 120 into one or more specific purpose machines that automatedly verify entities and entity accounts. Accordingly, some of the tangible results produced by the verification system 120 include automatically identifying entity records, disseminating verification codes through the various communication mediums, issuance of verification badges to be associated and displayed next to verified entities and verified entity accounts, and automated tools for verifying entities and entity accounts.

The interface plug-in 1910 facilitates communications with the various service providers, entity record databases, entities, and supplemental sources. Specifically, the interface plug-in 1910 includes the necessary data conversion routines and communication protocols that allow the verification system 120 to communicably couple with these external parties, where communicably coupling includes as some examples, searching the entity record databases to identify matching entity records, presenting interactive GUIs to entities undergoing verification, receiving entity account information from the service providers, accessing accounts at the service providers to send messages with the first verification code to accounts of the entities at the service providers, monitoring for account associations, and disseminating the communication with the second verification code via the different forms of communication. A different interface plug-in 1910 may be used for a different subset of external parties depending on the data formats and communication protocols utilized by such parties. Additional description for the interface plug-in 1910 is provided below with reference to the verification engine 1940.

The data parser 1920 parses incoming data to extract various elements that may be used to perform data matching and the verification campaign. The incoming data may include the entity account information provided by the service providers and entity records obtained from the entity record databases. The parsed elements from the incoming data may include extracted handles, usernames, email addresses, telephone numbers, street addresses, individual names, business names, other identification information, and other contact information. Such data may be parsed according Extensible Markup Language (XML) tags or pattern matching techniques that can identify various delimiters such as the "@" for email addresses, 10 digit telephone formatting, and number, street, city formatting for street addresses as some examples.

The data matcher 1930 matches entity account information to entity records or matches entity records to entity account information. In some embodiments, matching requires that the entity account information match to the entity record by some specified threshold degree of accuracy. In some embodiments, the matching involves data pruning, data cleansing, and data normalization. The accuracy of the match is dependent on how closely two data elements resemble one another. For example, the character strings "George Washington" and "george washington" have 99% matching accuracy, whereas the character strings "William Jefferson Clinton" and "Bill Clinton" have 60% matching accuracy. Several well refined processes and techniques exist for performing data matching and are implemented in various commercially available MDM solutions. Accordingly, the data matcher 1930 may employ one or more such processes and techniques or the data matcher 1930 may comprise a third party data matching tool. In some embodiments, the data matcher 1930 does not perform the actual data matching, but offloads the data matching to the service providers that store the entity account information or entity record databases that store the entity records. In some such embodiments, the data matcher 1930 generates queries to the service providers or entity record databases. The queries include parsed elements against which matching is to be performed.

The verification engine 1940 performs the verification campaign in its various forms. To do so, the verification engine 1940 contains logic in the form of computer coded instructions that perform each part of the first and second parts of the verification campaign.

For the first part of the verification campaign, the verification engine 1940 leverages the interface plug-in 1910 to request and monitor for association of an entity account that is registered at a particular service provider with a verification system account that is registered at the particular service provider. Alternatively or additionally, the verification engine 1940 leverages the interface plug-in 1910 to submit a first verification code to the entity account at the particular service provider using a messaging format of the particular service provider. The verification system 1940 then monitors for completion of the first part of the verification campaign by monitoring for the association of the entity account and/or by monitoring for return of the first verification code.

For the second part of the verification campaign, the verification engine 1940 identifies and extracts contact information from the entity record of the entity that is to be verified. Such identification and extraction includes identifying specific tags or delimiters within the entity record, such as the tag <telephone> that delimits the telephone number for contacting an entity or the delimiter "@" which begins with and ends with a continuous set of alphanumeric characters representing an email address. The verification engine 1940 then leverages the interface plug-in 1910 to submit a second verification code to the entity based on the extracted contact information. The verification system 1940 then monitors for completion of the second part of the verification campaign by monitoring for return of the second verification code.

Using the interface plug-in 1910, the verification engine 1940 can disseminate the verification codes using (1) accounts of the verification system at different service providers, (2) emails, (3) telephone audio messages, (4) text messages, and (5) Twitter tweets. The interface plug-in 1910 is bidirectional such that the verification engine 1940 can receive the return verification codes via (1) accounts of the verification system at different service providers, (2) emails, (3) key tones and speech pattern recognition for telephone communications, (4) reply text messages, and (5) reply tweets. It should be apparent to one of ordinary skill that the verification engine 1940 may incorporate additional or alternate communication interfaces in addition to those enumerated above such as automated submission of a physical mailing. For entities that have been verified, the verification engine 1940 utilizes the interface plug-in 1910 to notify the appropriate service provider and/or entity of the verified status. Additionally or alternatively, the verification engine 1940 may update entity records of the entity record databases to reflect newly verified entities. Additionally or alternatively, the verification engine 1940 may store information about verified entities to the database 1960.

The verification engine 1940 includes a code generator that dynamically generates different verification codes for different unverified entities that have been selected for verification. In some embodiments, the code generator generates a random number of a specified length as a verification code. Each verification code is associated with a different unverified entity and stored in a queue for a specified duration while the verification engine 1940 awaits for the entity to reply with the code. If the entity replies within the specified duration, the entity is verified. Otherwise, the verification code expires and the verification process will have to be restarted for the corresponding entity. In some embodiments, the verification code may be encoded to identify the entity undergoing verification such that when the code is returned back to the verification engine 1940, the verification engine 1940 ascertains the entity associated with that verification code directly from the provided verification code. For example, the verification code may be formatted as "AZAZAZAZAZAZAZA" wherein the "A" characters uniquely identify the entity to be verified and can include, for example, a DUNS® number of the entity and the "Z" characters include a random number that is generated by the verification engine 1940. In this manner, the verification engine 1940 maintains only a minimal set of information when performing the verification campaign and while awaiting the verification response from the entity.

The data scraper 1945 aggregates and scrapes various data from different websites and service providers. The data scraper 1945 may be tasked with scraping an entity's website to extract usable data. The data scraper 1945 may additionally be tasked with aggregating publicly available message and posts at different service providers.

The transaction processor 1950 is the payment processing component of the verification system 120. The transaction processor 1950 is an optional component of the verification system 120, but is represented here as a preferred means for monetizing the automatic entity verification service provided by the verification system of some embodiments. The transaction processor 1950 receives and processes payment in order to perform or complete entity verification. Payment may be provided by service providers that seek to have some or all of their registered accounts verified. Payment may also be provided by entities that request one or more of their accounts to be verified. For example, the transaction processor 1950 may send an invoice with payment information to a service provider after the service provider has identified a set of entities that it wishes to have verified. Once payment information is provided by the service provider, the transaction processor 1950 notifies the verification engine 1940 to perform the verification campaign to the identified set of entities.

In some embodiments, the database 1960 is comprised of one or more distinct databases. In some embodiments, the database 1960 locally stores the entity records so that the verification system 120 can operate independent of third party entity record databases such as the databases maintained by Dun & Bradstreet as one example. In some embodiments, the database 1960 temporarily stores entity records obtained from one or more third party entity record databases for a set of entities that are to be verified while the verification campaign is being conducted. In some embodiments, the database 1960 stores information for verification campaigns that are queued, pending, or completed. For example, the database 1960 may store the verification codes that have been sent to different entities such that when a particular verification code is returned, a lookup to the database 1960 will reveal the entity that is to be verified. In some embodiments, the database 1960 stores lists of verified entities. In some such embodiments, service providers plug-in to the verification system and on-the-fly query the database 1960 to identify verified entities. In some such embodiments, the verification system 120 and, more specifically, the database 1960 acts as a central store of entity verification information with which any number of different service providers and entities can access the verification information.

Many of the above-described processes and components are implemented as software processes that are specified as a set of instructions recorded on a computer readable storage medium (also referred to as computer readable medium). When these instructions are executed by one or more computational element(s) (such as processors or other computational elements like ASICs and FPGAs), they cause the computational element(s) to perform the actions indicated in the instructions. Computer and computer system is meant in its broadest sense, and can include any electronic device with a processor including cellular telephones, smartphones, portable digital assistants, tablet devices, laptops, and netbooks. Examples of computer readable media include, but are not limited to, CD-ROMs, flash drives, RAM chips, hard drives, EPROMs, etc.

Figure 20:
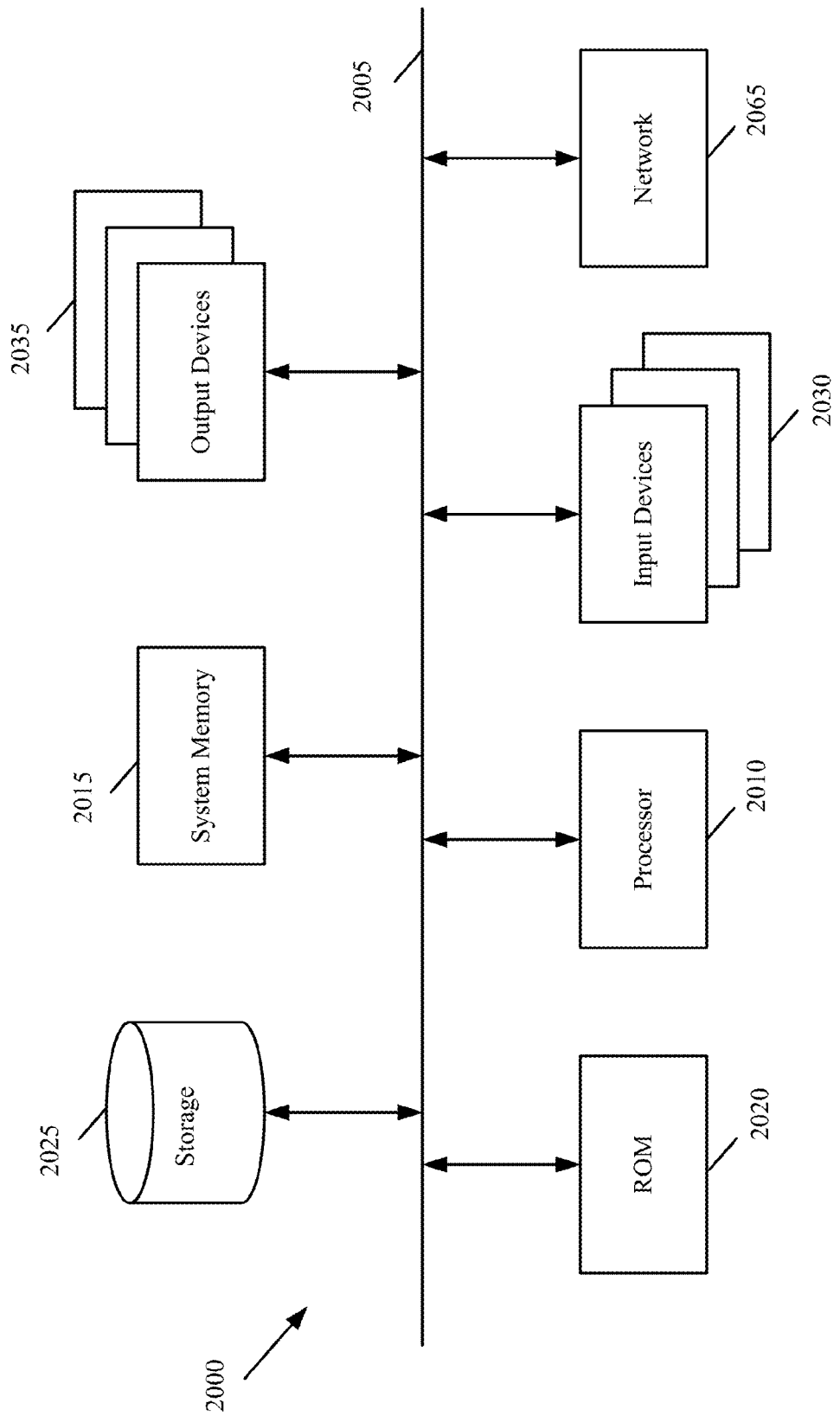
FIG. 20 illustrates a computer system with which some embodiments are implemented.

FIG. 20 illustrates a computer system with which some embodiments are implemented. Such a computer system includes various types of computer readable mediums and interfaces for various other types of computer readable mediums that implement the various processes, modules, and engines described above for the verification system. Computer system 2000 includes a bus 2005, a processor 2010, a system memory 2015, a read-only memory 2020, a permanent storage device 2025, input devices 2030, and output devices 2035.

The bus 2005 collectively represents all system, peripheral, and chipset buses that communicatively connect the numerous internal devices of the computer system 2000. For instance, the bus 2005 communicatively connects the processor 2010 with the read-only memory 2020, the system memory 2015, and the permanent storage device 2025. From these various memory units, the processor 2010 retrieves instructions to execute and data to process in order to execute the processes of the invention. The processor 2010 is a processing device such as a central processing unit, integrated circuit, graphical processing unit, etc.

The read-only-memory (ROM) 2020 stores static data and instructions that are needed by the processor 2010 and other modules of the computer system. The permanent storage device 2025, on the other hand, is a read-and-write memory device. This device is a non-volatile memory unit that stores instructions and data even when the computer system 2000 is off. Some embodiments of the invention use a mass-storage device (such as a magnetic or optical disk and its corresponding disk drive) as the permanent storage device 2025.

Other embodiments use a removable storage device (such as a flash drive) as the permanent storage device Like the permanent storage device 2025, the system memory 2015 is a read-and-write memory device. However, unlike storage device 2025, the system memory is a volatile read-and-write memory, such a random access memory (RAM). The system memory stores some of the instructions and data that the processor needs at runtime. In some embodiments, the processes are stored in the system memory 2015, the permanent storage device 2025, and/or the read-only memory 2020.

The bus 2005 also connects to the input and output devices 2030 and 2035. The input devices enable the user to communicate information and select commands to the computer system. The input devices 2030 include any of a capacitive touchscreen, resistive touchscreen, any other touchscreen technology, a trackpad that is part of the computing system 2000 or attached as a peripheral, a set of touch sensitive buttons or touch sensitive keys that are used to provide inputs to the computing system 2000, or any other touch sensing hardware that detects multiple touches and that is coupled to the computing system 2000 or is attached as a peripheral. The input device 2030 also include alphanumeric keypads (including physical keyboards and touchscreen keyboards), pointing devices (also called "cursor control devices"). The input devices 2030 also include audio input devices (e.g., microphones, MIDI musical instruments, etc.). The output devices 2035 display images generated by the computer system. For instance, these devices display the KEI. The output devices include printers and display devices, such as cathode ray tubes (CRT) or liquid crystal displays (LCD).

Finally, as shown in FIG. 20, bus 2005 also couples computer 2000 to a network 2065 through a network adapter (not shown). In this manner, the computer can be a part of a network of computers (such as a local area network ("LAN"), a wide area network ("WAN"), or an Intranet, or a network of networks, such as the internet. For example, the computer 2000 may be coupled to a web server (network 2065) so that a web browser executing on the computer 2000 can interact with the web server as a user interacts with a GUI that operates in the web browser.

As mentioned above, the computer system 2000 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention.

We claim:

1. An entity verification system comprising a microprocessor and a non-transitory computer-readable storage medium with an executable program stored thereon, wherein said program instructs said microprocessor to perform sets of instructions for:
   receiving a request comprising at least one identifier for identifying an entity;
   matching said identifier to a particular data structure of a plurality of data structures stored to a trusted database, wherein the particular data structure comprises identification information that has been previously verified for the entity;
   identifying an account representing the entity at a social media site using the identification information;
   verifying that the entity is an owner of the account by monitoring for completion of a verification task comprising one of (i) return receipt of a code that the entity verification system passes to the account and (ii) performance of an association action linking the account to another account at the social media site;
   increasing a verification level of the entity when the entity is verified as the owner of the account upon completion of the verification task;
   querying to identify based on at least one item of identification information from the particular data structure, a website containing supplemental identification information about the entity, wherein the website is a different data source than the trusted database;
   parsing the website to identify the supplemental identification information about the entity from other information that is unrelated to the entity;
   corroborating the supplemental identification information from the website with the identification information from the particular data structure; and
   modifying the verification level of the entity by (i) increasing the verification level when the supplemental identification information from the website matches to the identification information from the particular data structure and (ii) decreasing the verification level when the identification information from the website does not match to the information from particular data structure.

2. The entity verification system of claim 1, wherein the program further comprises a set of instructions for performing a two part verification of said entity.

3. The entity verification system of claim 2, wherein a first part of the two part verification comprises (i) communicating a code to said entity using a verified method of contact that is obtained from the identification information of the particular data structure, and (ii) monitoring for said code to be returned.

4. The entity verification system of claim 3, wherein a second part of the two part verification comprises (i) requesting that the account representing the entity at the social media site be associated with an account that said verification system has registered with the social media site and (ii) monitoring for completion of said association.

5. The entity verification system of claim 3, wherein the code is a first code and wherein a second part of the two part verification comprises (i) disseminating a second code to the account representing the entity at the social media site using a messaging format of the social media site and (ii) monitoring for return of the second code.

6. The entity verification system of claim 1, wherein said program further comprises a set of instructions for presenting the verification level of the entity.

7. The entity verification system of claim 6, wherein said program further comprises a set of instructions for presenting a verification level for each item of corroborated identification information for said entity.

8. The entity verification system of claim 1, wherein said program further a set of instructions for notifying the social media site of the verification level of the entity.

9. A verification system comprising a microprocessor and a non-transitory computer-readable storage medium with an executable program stored thereon, said program for verifying an entity at a particular social media site when said entity has registered an account at the particular social media site, wherein said program instructs said microprocessor to perform sets of instructions for:
   receiving a data structure comprising verified identification information and contact information for said entity;
   querying the particular social media site using the identification information to identify a particular unverified account representing the entity at the social media site;
   sending a request to said entity based on contact information from the data structure, said request comprising (i) an identifier identifying an account that is registered to the verification system at the social media site and (ii) instructions for performing an association action to create a link between the verification system account and the particular unverified account at the social media site;
   monitoring for completion of said association between the verification system account and the particular unverified account at the particular social media site;
   identifying based the identification information from the data structure, a third party site containing supplemental identification information about the entity;
   corroborating the supplemental identification information from the third party site with identification information from the data structure; and
   generating a verification status for said entity based on (i) completion of the association between the verification system account and the particular unverified account and (ii) amount with which the supplemental identification information from the third party site matches to the identification information from the data structure.

10. The verification system of claim 9, wherein said program further comprises a set of instructions for disseminating a code to the particular unverified account using messaging of the particular social media site, and wherein sending a request to said entity comprises requesting said entity to access the particular unverified account to retrieve and return said code to the verification system.

11. The verification system of claim 10, wherein the set of instructions for monitoring for completion of said association comprises a set of instructions for monitoring for return of said code.

12. A method performed by a verification system comprising a microprocessor and a non-transitory computer-readable storage medium for verifying an entity at a social media site when said entity has registered an account at the social media site, the method comprising:
   receiving a data structure at said verification system, said data structure comprising verified identification information and contact information for said entity;
   based on contact information from the data structure, sending a message from said verification system to said entity, said message comprising (i) a verification code and (ii) an identifier to a first account that is registered by the verification system at the social media site to which the verification code is to be returned in order to verify the entity at the social media site;

accessing the first account at the social media site;

monitoring the first account for a message that contains the verification code from a second account that is registered at the social media site;

verifying the second account represents said entity at the social media site upon the verification system receiving the message containing the verification code at the first account, wherein said verifying comprises modifying said non-transitory computer-readable storage medium to store verification status of said entity;

obtaining supplemental identification information about the entity from the second account at the social media site; and modifying the verification status of said entity based on a number of matches between the supplemental identification information from the second account and the identification information from the data structure.

13. A method performed by a verification system comprising a microprocessor and a non-transitory computer-readable storage medium, said method comprising:

receiving a request at said verification system, said request comprising at least one identifier for identifying an entity;

matching by said verification system, said identifier to a particular data structure of a plurality of data structures stored to a trusted database, wherein the particular data structure comprises identification information that has been previously verified for the entity;

identifying an account representing the entity at a social media site using the identification information;

verifying that the entity is an owner of the account by monitoring for completion of a verification task comprising one of (i) return receipt of a code that the entity verification system passes to the account and (ii) performance of an association action linking the account to another account at the social media site;

increasing a verification level of the entity when the entity is verified as the owner of the account upon completion of the verification task;

querying by said verification system to identify based on at least one item of identification information from the particular data structure, a website containing supplemental identification information about said entity, wherein the website is a different data source than the trusted database;

parsing the website to identify the supplemental identification information about the entity from other information that is unrelated to the entity;

corroborating the supplemental identification information from the website with the identification information from the particular data structure; and modifying the verification level of the entity by (i) increasing the verification level when the supplemental identification information from the website matches to the identification information from the particular data structure and (ii) decreasing the verification level when the identification information from the website does not match to the information from particular data structure.

14. The method of claim 13 further comprising extracting the supplemental identification information about said entity from the website, wherein extracting comprises scraping the supplemental identification information from the website.

15. The method of claim 13, wherein matching said identifier comprises searching the trusted database with said identifier to identify said particular data structure with identification information matching to said identifier by a specified threshold.

16. The method of claim 13 further comprising providing the verification level of said entity to the online service provider.

17. The method of claim 13 further comprising presenting the verification level of said entity through a user interface.

18. The method of claim 17 further comprising presenting a verification level for each item of corroborated identification information for said entity.

19. The entity verification system of claim 1, wherein the website is a first website, the program further comprising a set of instructions for querying to identify based on at least one item of identification information from the particular data structure, a second website containing supplemental identification information about the entity, wherein the first website is addressed at a different domain than the second website.

20. The entity verification system of claim 19, wherein the program further comprises a set of instructions for extracting the supplemental identification information about said entity from the second website and corroborating the supplemental identification information from the second website with identification information from the particular data structure.

21. The entity verification system of claim 20, wherein the program further comprises a set of instructions for modifying the verification level of the entity to increase the verification level when the supplemental identification information from the second website matches to the identification information from the particular data structure and to decrease the verification level when the supplemental identification information from the second website does not match to the information from particular data structure.

* * * * *